(12) United States Patent
Hamada

(10) Patent No.: US 9,667,856 B2
(45) Date of Patent: May 30, 2017

(54) AUTO FOCUS ADJUSTING METHOD, AUTO FOCUS ADJUSTING APPARATUS, AND DIGITAL PHOTOGRAPHING APPARATUS INCLUDING THE SAME

(71) Applicant: SAMSUNG ELECTRONICS CO., LTD., Suwon-si, Gyeonggi-do (KR)

(72) Inventor: Masataka Hamada, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/848,863

(22) Filed: Sep. 9, 2015

(65) Prior Publication Data
US 2016/0073009 A1    Mar. 10, 2016

Related U.S. Application Data

(63) Continuation of application No. 13/566,002, filed on Aug. 3, 2012, now Pat. No. 9,152,010.

(30) Foreign Application Priority Data

Aug. 5, 2011 (KR) .................. 10-2011-0078201

(51) Int. Cl.
*H04N 5/232* (2006.01)
*H04N 5/235* (2006.01)
(Continued)

(52) U.S. Cl.
CPC .......... *H04N 5/23212* (2013.01); *G02B 7/38* (2013.01); *G03B 3/10* (2013.01); *H04N 5/2353* (2013.01); *H04N 5/23209* (2013.01)

(58) Field of Classification Search
CPC .. G02B 7/38; H04N 5/23209; H04N 5/23212; H04N 5/2353
See application file for complete search history.

(56) References Cited

U.S. PATENT DOCUMENTS 5,109,249 A    4/1992  Kitajima
5,457,513 A    10/1995 Uenaka
(Continued)

FOREIGN PATENT DOCUMENTS

CN    1402077 A    3/2003
CN    1428645 A    7/2003
(Continued)

OTHER PUBLICATIONS

PCT Search Report and Written Opinion issued for related application PCT/KR2012/006199, Feb. 27, 2013, 11 pages.
(Continued)

*Primary Examiner* — Amy Hsu
(74) *Attorney, Agent, or Firm* — Drinker Biddle & Reath LLP

(57) ABSTRACT

An auto focus (AF) adjusting method, an AF adjusting apparatus, and a digital photographing apparatus including the same, the AF adjusting apparatus including: an AF calculator for calculating focus detection evaluation values; a peak detector for detecting a peak position of the focus detection evaluation values; and a speed calculator for calculating a moving speed of a subject by using the peak position. When continuous photographing of still images is performed, the peak detector detects the peak position in an image pickup interval before a light exposure preparation interval for image capturing, and the focus lens driver performs moving body compensation driving for compensating for a focal position by using a moving speed calculated in the light exposure preparation interval before capturing starts.

19 Claims, 22 Drawing Sheets

(51) Int. Cl.
*G03B 3/10* (2006.01)
*G02B 7/38* (2006.01)

(56) References Cited

U.S. PATENT DOCUMENTS

| | | | |
|---|---|---|---|
| 6,701,075 | B2 | 3/2004 | Ogino |
| 6,704,054 | B1 | 3/2004 | Hashimoto |
| 6,768,867 | B2 | 7/2004 | Kindaichi et al. |
| 7,515,200 | B2 | 4/2009 | Yasuda |
| 7,634,185 | B2 | 12/2009 | Terayama et al. |
| 8,521,015 | B2 | 8/2013 | Ogino |
| 2001/0004268 | A1* | 6/2001 | Kubo ................. H04N 1/00453 348/333.02 |
| 2002/0127012 | A1 | 9/2002 | Okawara |
| 2004/0001158 | A1 | 1/2004 | Aoki |
| 2004/0135891 | A1 | 7/2004 | Shindo et al. |
| 2005/0052553 | A1 | 3/2005 | Kido et al. |
| 2005/0099522 | A1 | 5/2005 | Kondo et al. |
| 2005/0212950 | A1 | 9/2005 | Kanai |
| 2005/0285967 | A1* | 12/2005 | Suda .................. H04N 5/23212 348/345 |
| 2006/0008265 | A1 | 1/2006 | Ito |
| 2006/0198624 | A1 | 9/2006 | Ono et al. |
| 2007/0030381 | A1 | 2/2007 | Maeda |
| 2007/0153112 | A1* | 7/2007 | Ueda ..................... G03B 19/12 348/335 |
| 2007/0189745 | A1 | 8/2007 | Masuda |
| 2008/0239136 | A1 | 10/2008 | Kanai et al. |
| 2009/0185069 | A1* | 7/2009 | Aoyama ............ H04N 5/23212 348/346 |
| 2009/0268083 | A1 | 10/2009 | Arishima et al. |
| 2011/0032414 | A1 | 2/2011 | Sumiyoshi et al. |
| 2011/0043678 | A1* | 2/2011 | Ueda ..................... G03B 13/36 348/345 |
| 2011/0141344 | A1 | 6/2011 | Abe |
| 2011/0149129 | A1 | 6/2011 | Kim et al. |
| 2011/0149130 | A1* | 6/2011 | Takane ............... H04N 5/23248 348/296 |
| 2011/0228163 | A1 | 9/2011 | Isaka et al. |
| 2011/0234834 | A1* | 9/2011 | Sugimoto ............. H04N 5/232 348/222.1 |

FOREIGN PATENT DOCUMENTS

| | | |
|---|---|---|
| CN | 101013190 A | 8/2007 |
| CN | 101672974 A | 3/2010 |
| JP | 2000-131598 A | 5/2000 |
| JP | 2004-020742 A | 1/2004 |
| JP | 2005-134820 A | 5/2005 |
| JP | 2008-058556 A | 3/2008 |
| JP | 2009-128610 A | 6/2009 |
| JP | 2010-008507 A | 1/2010 |
| JP | 2010-107711 A | 5/2010 |
| JP | 2010-169882 A | 8/2010 |

OTHER PUBLICATIONS

Office Action issued in related application CN 201210277330.6, Aug. 30, 2016, with English language translation, 23 pages.
Office Action issued in related application KR 10-2011-0078201, May 12, 2016, with English language translation, 10 pages.
Notice of Allowance issued for related application KR 10-2011-0078201, Dec. 26, 2016, with English language translation, 4 pages.

* cited by examiner

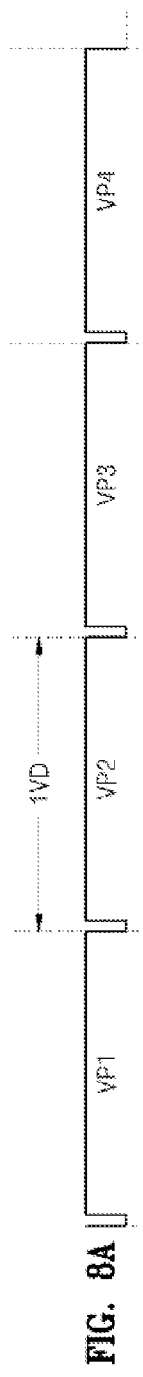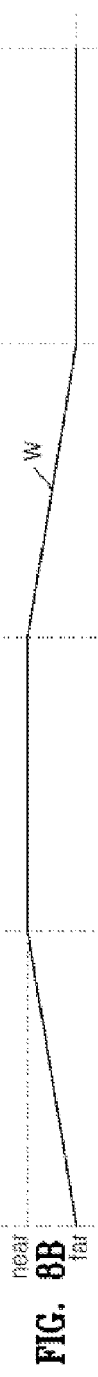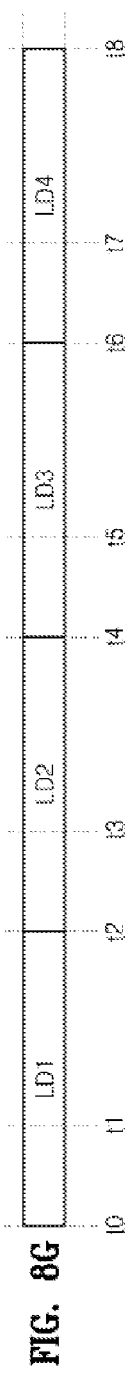

AUTO FOCUS ADJUSTING METHOD, AUTO FOCUS ADJUSTING APPARATUS, AND DIGITAL PHOTOGRAPHING APPARATUS INCLUDING THE SAME

CROSS-REFERENCE TO RELATED PATENT APPLICATIONS

This application is a continuation of U.S. patent application Ser. No. 13/566,002, filed Aug. 3, 2012, now U.S. Pat. No. 9,152,010, which claims the benefit of Korean Patent Application No. 10-2011-0078201, filed on Aug. 5, 2011, in the Korean Intellectual Property Office, the disclosures of which are incorporated herein in their entirety by reference.

BACKGROUND

1. Field

The invention relates to an auto focus (AF) adjusting method, an AF adjusting apparatus, and a digital photographing apparatus including the same.

2. Description of the Related Art

In digital photographing apparatuses, such as cameras and camcorders, as well as smartphones and other devices that include a digital imaging module, to capture a clear still image or a clear moving picture, it is important to correctly focus on a subject. There is a contrast auto focus (AF) method and a phase difference AF method as for automatically performing focus adjustment.

The contrast AF method is a method of acquiring contrast values with respect to image signals generated from an image pickup sensor while performing photographing by changing a position of a focus lens, and driving the focus lens to a focus lens position of a peak contrast value. However, because it takes time to detect a peak position, that is a focal position in the contrast AF method, it is not easy to focus when a moving subject is photographed.

SUMMARY

An embodiment of the invention provides an auto focus (AF) adjusting method and an AF adjusting apparatus, whereby a moving subject can be quickly and correctly focused by using a contrast AF method even when continuous photographing is performed, and a digital photographing apparatus including the same According to an embodiment, there is provided an auto focus (AF) adjusting apparatus including: an image pickup lens in which the position of a focus lens is variable for focus adjustment; a focus lens driver for driving the focus lens; an image pickup device for generating an image signal by picking up light which has passed through the image pickup lens; an AF calculator for calculating focus detection evaluation values from the image signal; a peak detector for detecting the peak position of the focus detection evaluation values; a shutter for controlling light exposure of the image pickup device; and a speed calculator for calculating the moving speed of a subject by using the peak position, wherein, when continuous photographing for continuously capturing still images is performed, the peak detector detects the peak position in an image pickup interval before a light exposure preparation interval for image capturing, and the focus lens driver performs moving body compensation driving for compensating for a focal position by using a moving speed calculated in the light exposure preparation interval before capturing starts.

The shutter may be a mechanical shutter including a front curtain and a rear curtain.

The moving body compensation driving may be performed before driving to change the shutter to a closed state is completed.

The shutter may be an electronic front curtain shutter including an electronic front curtain for beginning light exposure by resetting electric charges and a mechanical rear curtain for ending the light exposure.

The moving body compensation driving may be performed in an interval before beginning to drive the front curtain for image capturing after stopping driving for selectively reading electric charges from the image pickup device.

Alternatively, the shutter may be a global shutter including an electronic front curtain for beginning light exposure by resetting electric charges and an electronic rear curtain for ending the light exposure.

Alternatively, the moving body compensation driving may be performed in an interval before beginning to drive the front curtain for image capturing after stopping driving for selectively reading electric charges from the image pickup device.

The AF adjusting apparatus may end displaying before image capturing, and the moving body compensation driving may be performed in an interval before beginning the image capturing after ending the displaying.

The detection of the peak position may be performed by driving the focus lens back and forth.

During continuous photographing, detecting a peak position multiple times may be performed in the image pickup interval before the light exposure preparation interval, and the moving speed of the subject may be calculated from a result of the detecting of a peak position multiple times.

During continuous photographing, the peak position detection may be performed at least once in the image pickup interval before the light exposure preparation interval for every image capturing, and the moving speed of the subject may be calculated by using a peak position result detected in the image pickup interval for current image capturing and a peak position result detected in the image pickup interval for previous image capturing.

During continuous photographing, when the moving speed of the subject is fast, the peak position detection may be performed once in the image pickup interval before the light exposure preparation interval, and when the moving speed of the subject is slow, the peak position detection may be performed multiple times in the image pickup interval before the light exposure preparation interval.

During continuous photographing, the moving speed of the subject may be determined by using the moving speed of the subject acquired until the continuous photographing starts or the moving speed of the subject obtained in previous capturing during the continuous photographing.

When the moving speed of the subject is acquired before the continuous photographing starts, the acquired moving speed and a moving speed of the subject acquired during the continuous photographing may both be used to predict the peak position in capturing. But when the moving speed of the subject is not acquired before the continuous photographing starts, the moving speed of the subject acquired during the continuous photographing may be used to predict the peak position in capturing.

The moving body compensation driving may be performed by predicting the peak position from the moving speed of the subject and a time until capturing.

When the moving speed of the subject is acquired, the moving body compensation driving may be performed by predicting the peak position according to movement of the subject in an interval from a light exposure end time to an image pickup start time before the light exposure preparation interval for image capturing by using the acquired moving speed.

According to another embodiment, there is provided an auto focus (AF) adjusting method of an AF adjusting apparatus capable of continuous photographing in which still images are continuously captured, the AF adjusting method including: generating an image signal by picking up light from a subject; calculating focus detection evaluation values from the image signal; detecting the peak position of the focus detection evaluation values in an image pickup interval before a light exposure preparation interval for image capturing during the continuous photographing; calculating the moving speed of the subject by using the peak position; and compensating for the focal position by using the moving speed calculated in the light exposure preparation interval.

According to another embodiment, there is provided a digital photographing apparatus capable of performing auto focus (AF) adjustment, the digital photographing apparatus including: an image pickup lens in which the position of a focus lens is variable for focus adjustment; a focus lens driver for driving the focus lens; an image pickup device for generating an image signal by picking up light which has passed through the image pickup lens; an AF calculator for calculating focus detection evaluation values from the image signal; a peak detector for detecting the peak position of the focus detection evaluation values; a shutter for controlling light exposure of the image pickup device; and a speed calculator for calculating the moving speed of a subject by using the peak position, wherein, when continuous photographing for continuously capturing still images is performed, the peak detector detects the peak position in an image pickup interval before a light exposure preparation interval for image capturing, and the focus lens driver performs moving body compensation driving for compensating for a focal position by using the moving speed calculated in the light exposure preparation interval before capturing starts.

When the moving speed of the subject is acquired, the moving body compensation driving may be performed by predicting the peak position according to movement of the subject in an interval from a light exposure end time to an image pickup start time before the light exposure preparation interval for image capturing by using the acquired moving speed.

According to the above-described configuration, an AF adjusting apparatus and a digital photographing apparatus including the same according to embodiments of the invention can quickly and correctly focus on a moving subject even when continuous photographing is performed.

BRIEF DESCRIPTION OF THE DRAWINGS

The above and other features and advantages will become more apparent by describing in detail exemplary embodiments thereof with reference to the attached drawings in which:

FIGS. 8A, 8B, 8C, 8D, 8E, 8F, and FIG. 8G are timing diagrams of the moving body prediction AF performed with reference to FIG. 7;

DETAILED DESCRIPTION

Figure 1:
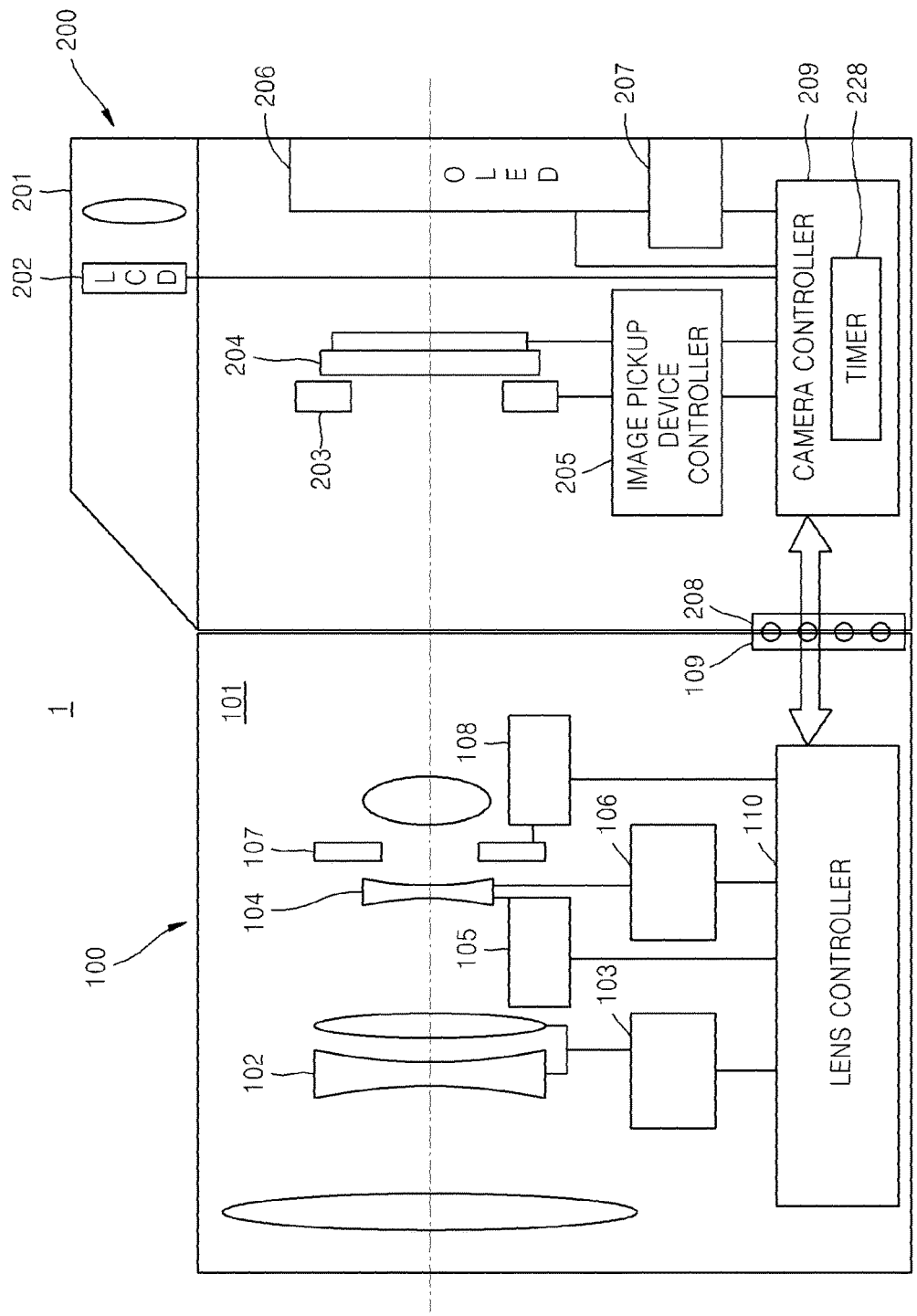
FIG. 1 is a block diagram of a digital photographing apparatus according to an embodiment.

The invention may allow various changes or modifications and various changes in form, and exemplary embodiments will be illustrated in drawings and described in detail in the specification. However, it should be understood that the exemplary embodiments do not limit the inventive concept to a specific disclosing form but include every modified, equivalent, or replaced from within the spirit and scope of the invention.

Hereinafter, exemplary embodiments are shown and described. Like reference numerals in the drawings denote like elements, and thus their repetitive description will be omitted.

[Configuration and Operation of a Digital Photographing Apparatus 1]

Referring to FIG. 1, the digital photographing apparatus 1 includes an interchangeable lens 100 and a main body 200. The interchangeable lens 100 includes a focus detection function, and the main body 200 includes a function of controlling the interchangeable lens 100 to drive a focus lens 104.

The interchangeable lens (hereinafter referred to as lens) 100 includes an image forming optical system 101, a zoom lens position sensing sensor 103, a lens driving actuator 105, a focus lens position sensing sensor 106, an iris driving actuator 108, a lens controller 110, and a lens mount 109.

The image forming optical system 101 includes a zoom lens 102 for zoom adjustment, the focus lens 104 for changing a focal position, and an iris 107. The zoom lens 102 and the focus lens 104 may each be a lens group in which a plurality of lenses are combined. Hereinafter, a combination of the zoom lens 102 and the focus lens 104 is called an image pickup lens.

The zoom lens position sensing sensor 103 and the focus lens position sensing sensor 106 sense positions of the zoom lens 102 and the focus lens 104, respectively. Timing for sensing the position of the focus lens 104 may be set by the lens controller 110 or a camera controller 209, which will be described below. For example, the timing for sensing the position of the focus lens 104 may be timing for performing auto focusing (AF) detection from an image signal.

The lens driving actuator 105 and the iris driving actuator 108 drive the zoom lens 102 and the focus lens 104 and the iris 107 under control of the lens controller 110, respectively. Specifically, the lens driving actuator 105 drives the focus lens 104 in an optical axis direction. That is, the lens driving actuator 105 may be an example of a focus lens driver.

The lens controller 110 transmits the sensed position information of the focus lens 104 to the main body 200. When the position of the focus lens 104 varies, or when the camera controller 209 requests for the position information of the focus lens 104, the lens controller 110 can transmit the sensed position information of the focus lens 104 to the main body 200.

The lens mount 109 includes lens-side communication pins engaged with camera-side communication pins, which are described below, to be used as a communication path of data, a control signal, etc.

A configuration of the main body 200 will now be described.

The main body 200 may include a view finder (EVF) 201, a shutter 203, an image pickup device 204, an image pickup device controller 205, a display unit 206, a manipulation unit 207, the camera controller 209, and a camera mount 208.

The EVF 201 may include a Liquid Crystal Display (LCD) 202, to display an image during image pickup in real time.

The shutter 203 determines the time for exposing the image pickup device 204 to light, i.e., an exposure time. Although both a front curtain and a rear curtain of the shutter 203 are mechanical in FIG. 1, the shutter 203 is not limited thereto. For example, the shutter 203 may be an electronic front curtain shutter including an electronic front curtain for beginning light exposure by resetting accumulated electric charges and a mechanical rear curtain. Alternatively, the shutter 203 may be a global shutter including an electronic front curtain beginning light exposure by resetting accumulated electric charges and an electronic rear curtain for ending the light exposure by transmitting accumulated electric charges to a light non-exposure part.

The image pickup device 204 generates an image signal by picking up image light which has passed through the image forming optical system 101 of the lens 100. The image pickup device 204 may include a plurality of photoelectric conversion elements arranged in a matrix form and a vertical or/and horizontal transmission line for reading an image signal by moving electric charges from the plurality of photoelectric conversion elements. For the image pickup device 204, a Charge-Coupled Device (CCD) sensor, a Complementary Metal Oxide Semiconductor (CMOS) sensor, or other image sensor may be used.

The image pickup device controller 205 generates a timing signal and controls the image pickup device 204 to pick up an image by synchronizing the timing signal. In addition, the image pickup device controller 205 sequentially reads an image signal as electric charge accumulation to scanning lines ends. The read image signal is used for AF detection by the camera controller 209.

The display unit 206 displays various kinds of images and information. For the display unit 206, an Organic Light Emitting Diode (OLED) display, a Liquid Crystal Display (LCD), or the like may be used. The display unit 206 may temporarily stop displaying a live-view image before capturing a still image.

The manipulation unit 207 allows a user to input various kinds of instructions for operating the digital photographing apparatus 1. The manipulation unit 207 may include various buttons such as a shutter release button, a main switch, a mode dial, and a menu button.

The camera controller 209 calculates a contrast value and performs AF detection using an image signal generated by the image pickup device 204. In addition, the camera controller 209 stores a contrast value at every AF detection time in response to the timing signal generated by the image pickup device controller 205 and calculates a focal position using the lens position information received from the lens 100 and the stored contrast value. A calculation result of the focal position is transmitted to the lens 100.

The camera mount 208 includes the camera-side communication pins. In addition, power may be supplied to the lens controller 110 via the camera mount 208.

An operation of the lens 100 and the main body 200 will now be described.

When an image is to be captured, an operation of the digital photographing apparatus 1 is started by manipulation of the main switch of the manipulation unit 207. The digital photographing apparatus 1 performs a live view display as described below.

Image light of the subject, which has passed through the image forming optical system 101, is incident on the image pickup device 204. At this time, the shutter 203 is open. The incident image light is converted into an electrical signals by the image pickup device 204, thereby generating an image signal. The image pickup device 204 operates by a timing signal generated by the image pickup device controller 205. The generated image signal of the subject is converted into displayable data by the camera controller 209 and is output to the EVF 201 and the display unit 206. This operation is the live view display, and live view images displayed by the live view display may be continuously displayed as a moving picture.

After the live view display is performed, if the shutter release button, one component of the manipulation unit 207, is pressed in a half-pressed state the digital photographing apparatus 1 starts an AF operation. The AF operation is performed using the image signal generated by the image pickup device 204. In a contrast AF method, a focal position is calculated from a focus detection evaluation value (hereinafter, referred to as 'AF evaluation value') associated with a contrast value, and the lens 100 is driven based on the calculation result. The AF evaluation value is calculated by the camera controller 209. The camera controller 209 calculates information for control of the focus lens 104 from the AF evaluation value and transmits the information to the lens controller 110 via the lens-side and the camera-side communication pins included in the lens mount 109 and the camera mount 208, respectively.

The lens controller 110 performs AF by driving the focus lens 104 in an optical axis direction by controlling the lens driving actuator 105 based on the received information. The position of the focus lens 104 is monitored by the focus lens position sensing sensor 106, thereby establishing a feedback control.

When the zoom lens 102 zooms according to a user's operation, the zoom lens position sensing sensor 103 senses the position of the zoom lens 102, and the lens controller 110 performs AF again by modifying AF control parameters of the focus lens 104.

When an image of the subject is in complete focus, the digital photographing apparatus 1 performs light exposure in a fully-pressed state of the shutter release button. At this time, the camera controller 209 fully closes the shutter 203 and transmits measured light information acquired up to that time to the lens controller 110 as iris control information. The lens controller 110 controls the iris driving actuator 108 based on the iris control information to operate the iris 107 to a proper iris value. The camera controller 209 controls the shutter 203 based on the measured light information to capture an image of the subject by opening the shutter 203 for a proper exposure time.

Figure 2:
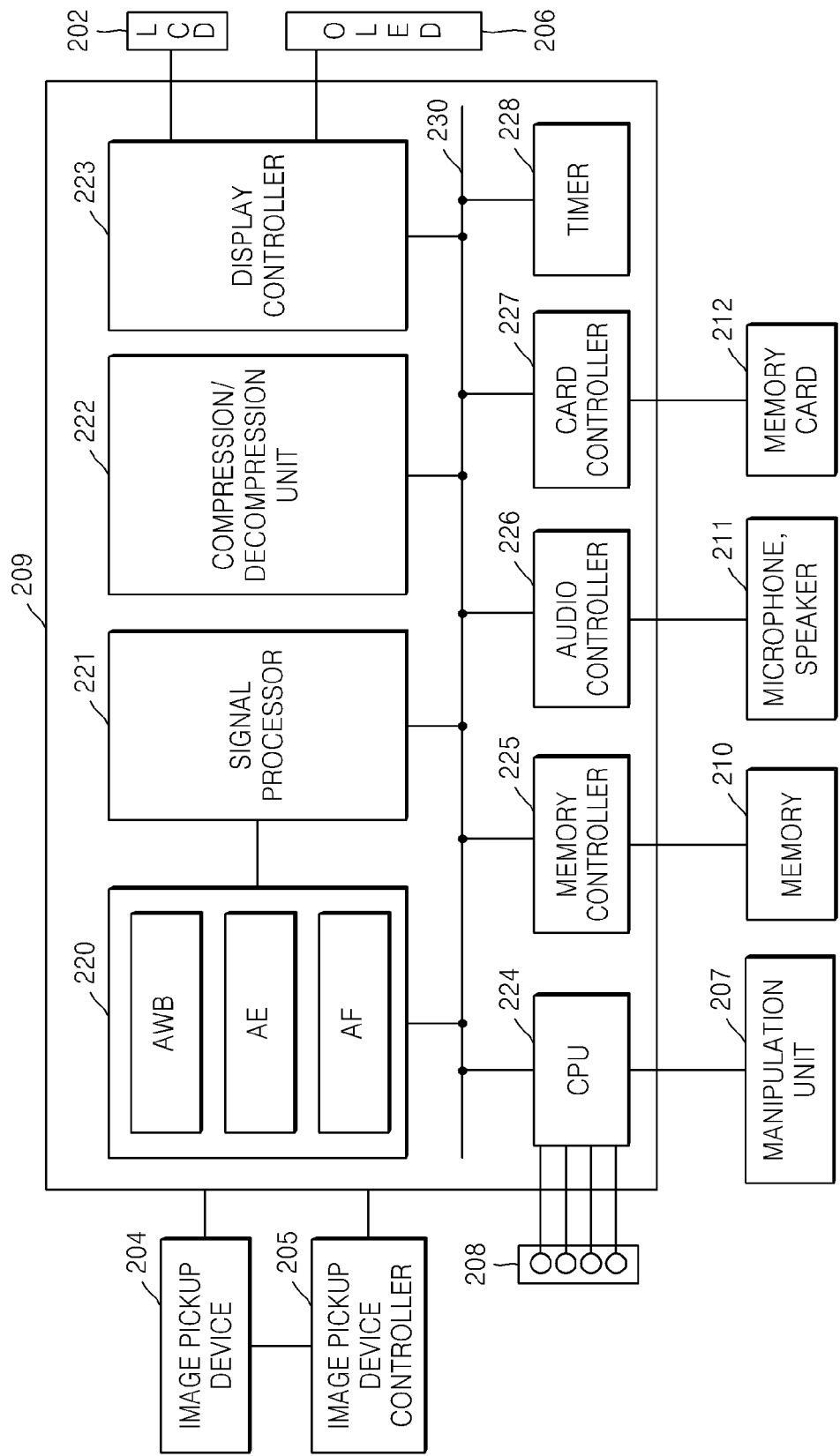
FIG. 2 is a block diagram of a camera controller according to an embodiment.

The captured image is image signal processed (and which may be compressed) and stored on a memory card (212 of FIG. 2). At the same time, the captured image is output to the EVF 201 and the display unit 206 to display a subject. Such an image is called a quick view image.

[Configuration of the Camera Controller 209]

Referring to FIG. 2, the camera controller 209 may include a pre-processor 220, a signal processor 221, a compression and decompression unit 222, a display controller 223, a Central Processing Unit (CPU) 224, a memory controller 225, an audio controller 226, a card controller 227, a timer 228, and a main bus 230.

The camera controller 209 provides various kinds of instructions and data to each component of the camera controller 209 via the main bus 230.

The pre-processor 220 receives an image signal generated by the image pickup device 204 and performs calculation of Auto White Balance (AWB), Auto Exposure (AE), and AF. The pre-processor 220 calculates an AF evaluation value for focus adjustment, an AE evaluation value for exposure adjustment, and an AWB evaluation value for white balance adjustment. The pre-processor 220 may be an example of an AF calculator.

The signal processor 221 performs a series of image signal processing operations, such as gamma compensation, to generate a live view image or a captured image displayable on the display unit 206.

The compression and decompression unit 222 performs compression and decompression of an image signal on which image signal processing has been performed. In the case of compression, an image signal is compressed in a compression format such as, for example, Joint Photographic Experts Group (JPEG) compression format or H.264 compression format. An image file including image data generated by the compression processing is transmitted to and recorded in a memory card 212.

The display controller 223 controls the image output to a display screen such as the LCD 202 of the EVF 201 or the display unit 206.

The CPU 224 generally controls an operation of each component of the camera controller 209. In addition, in the case of the digital photographing apparatus 1 illustrated in FIG. 1, the CPU 224 performs communication with the lens 100.

According to the current embodiment, the CPU 224 may detect a peak position of each AF evaluation value from AF evaluation values calculated by the pre-processor 220. In addition, the CPU 224 may calculate the moving speed of a subject by using the detected peak positions. That is, the CPU 224 may be an example of a peak detector and a speed calculator. However, the invention is not limited thereto, and another component may perform the peak detection and speed calculation function instead of the CPU 224.

The memory controller 225 controls a memory 210 to temporarily record data such as a captured image or associated information, and the audio controller 226 controls a microphone or speaker 211. The card controller 227 controls the memory card 212 to record captured images.

The timer 228 measures time.

Although it has been described with reference to FIGS. 1 and 2 that the lens 100 is an exchangeable lens detachably attached to the main body 200, the invention is not limited thereto. For example, the digital photographing apparatus 1 may include the lens 100 and the main body 200 one integrated body. In this case, the lens mount 109 and the camera mount 208 may be excluded, and the camera controller 209 may perform a function of the lens controller 110. For example, the camera controller 209 may directly control the lens driving actuator 105 and the iris driving actuator 108 and receive position information from the zoom lens position sensing sensor 103 and the focus lens position sensing sensor 106.

[AF Operating Method]

FIGS. 3A, 3B, 3C, and 3D illustrate an AF operation according to an embodiment of the contrast AF method. In the contrast AF method, the AF operation is performed by repeatedly calculating an AF evaluation value associated with a contrast value from an image signal and detecting a focal position with a position of the focus lens 104 at which a calculated AF evaluation value is a maximum value. Each horizontal axis of FIGS. 3A, 3B, 3C, and 3D indicates a position of the focus lens 104, and each vertical axis indicates an AF evaluation value.

Figure 3:
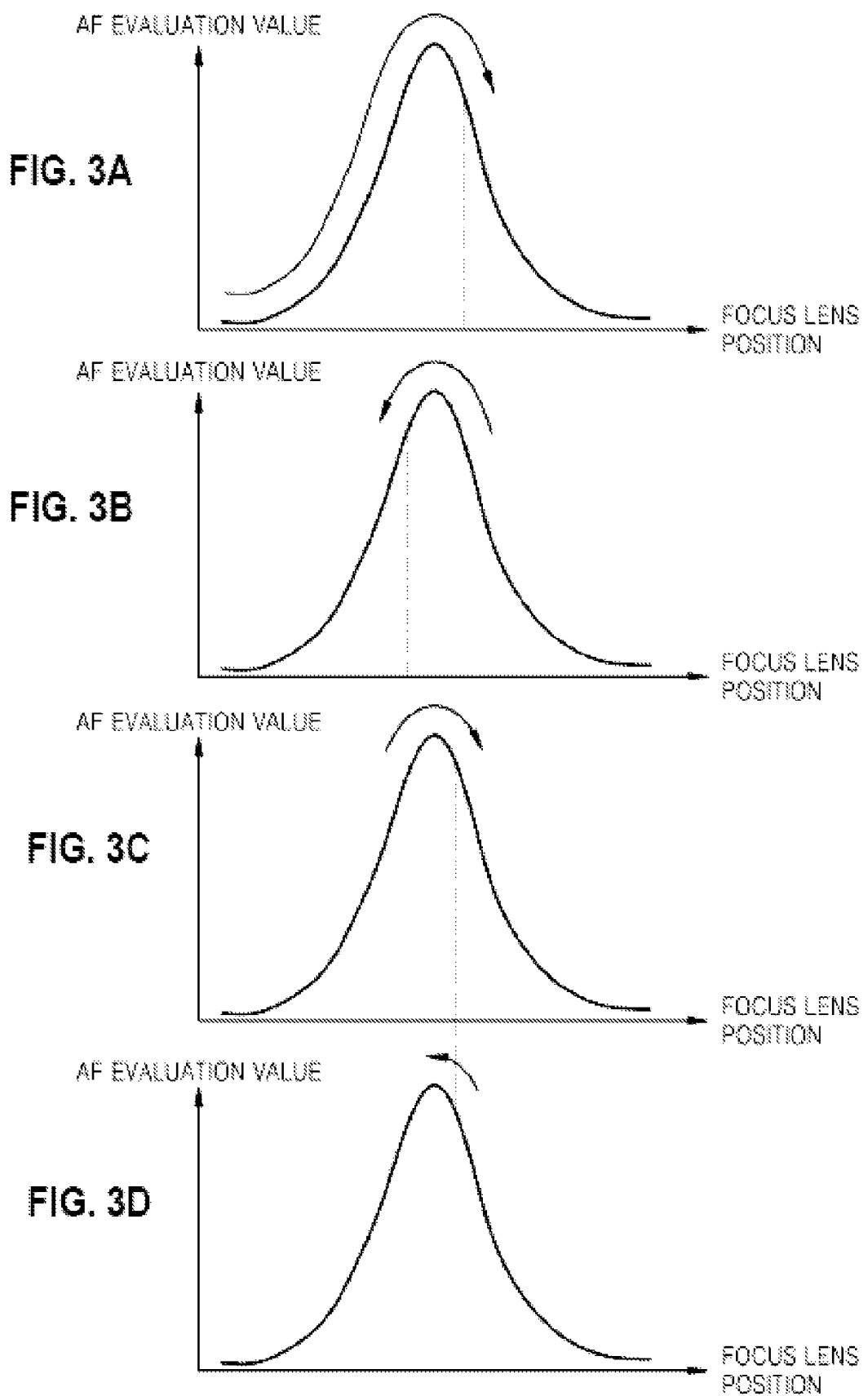
FIGS. 3A, 3B, 3C, and 3D illustrate graphs to describe an auto focus (AF) operation in a contrast AF method.

First, as shown in FIG. 3A, to detect a peak of AF evaluation value, scanning is performed by high-speed driving the focus lens 104 from one side to the other side (hereinafter, referred to as 'operation A'). Here, the scanning indicates calculating an AF evaluation value while driving the focus lens 104. An approximate peak position is detected by operation A.

Thereafter, as shown in FIG. 3B, the peak detection is performed again by reversing the driving direction of the focus lens 104 and more slowly driving the focus lens 104 than during operation A (hereinafter, referred to as 'operation B'). AF detection may be performed by operation B at a higher accuracy than operation A.

Thereafter, as shown in FIG. 3C, the driving direction of the focus lens 104 is reversed again, and the focus lens 104 is driven towards the focal position according to the detected peak (hereinafter, referred to as 'operation C'). At this time, a device for driving a lens usually has a backlash causing an error of a lens position according to a driving direction. Thus, the backlash needs to be removed, and in operation C, the focus lens 104 is driven over the focal position.

Finally, as shown in FIG. 3D, the driving direction of the focus lens 104 is reversed again, and the focus lens 104 is driven in the same direction as the driving direction according to operation B to stop at the focal position (hereinafter, referred to as 'operation D').

According to embodiments of the invention, AF evaluation values are calculated by performing a scanning operation even in operation C, and the calculated AF evaluation values are used to detect movement of a subject.

The AF operation is performed by operations A to D.

[Operation of the Digital Photographing Apparatus 1]

Figure 4:
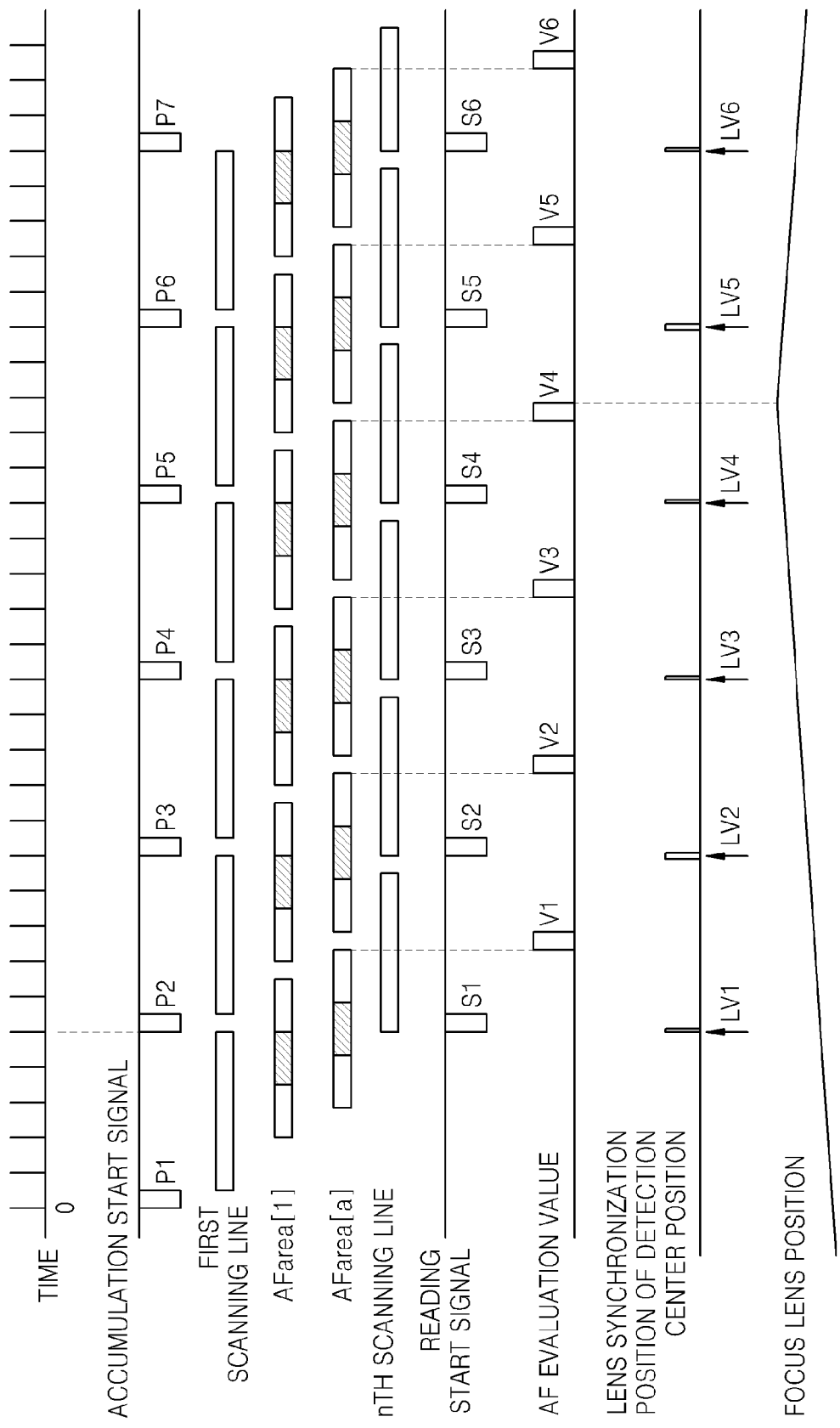
FIG. 4 is an AF operation timing diagram of the digital photographing apparatus according to an embodiment.

FIG. 4 is an AF operation timing diagram of the digital photographing apparatus 1 according to an embodiment.

Referring to FIG. 4, timing diagrams of an accumulation start signal, an electric charge accumulation signal of a first scanning line, AFarea[1] to AFarea[a] electric charge accumulation signals used for AF detection, an electric charge accumulation signal of an nth scanning line, and a reading start signal are sequentially shown from the top. Together with the plurality of timing diagrams, an AF evaluation value calculation timing diagram, a lens synchronization position of a central position of an image for which an AF evaluation value calculation is performed, and position information of the focus lens 104 at a timing corresponding to the lens synchronization position are shown. Here, AFarea[1] to AFarea[a] denote scanning lines included in an area for which AF detection is performed.

When accumulation start signals P1, P2, . . . are applied, electric charges are accumulated due to image light incident on first to nth scanning lines. At times when electric charge accumulation of the first scanning line ends, reading start signals S1, S2, . . . of an image signal are generated. Due to the reading start signals S1, S2, . . . , image signals are sequentially read from the first scanning line. The read image signals are transmitted to the camera controller 209. At times when electric charge accumulation of AFarea[1] to AFarea[a] included in an AF detection area ends, AF evaluation values V1, V2, . . . are calculated using the image signals read by the pre-processor 220. While calculating the AF evaluation values V1, V2, . . . , the focus lens 104 continuously moves at a constant speed.

In the current embodiment, at a time when a fourth AF evaluation value V4 is calculated, it is determined that the fourth AF evaluation value V4 is less than a previous AF evaluation value, i.e., that the fourth AF evaluation value V4 has passed a peak position. Thus, as shown in FIG. 4, from this time, the focus lens 104 is driven in a reverse direction. That is, at the time when the fourth AF evaluation value V4 is calculated, the AF operation proceeds from operation A to operation B. The operations C and D follow similarly.

Figure 5:
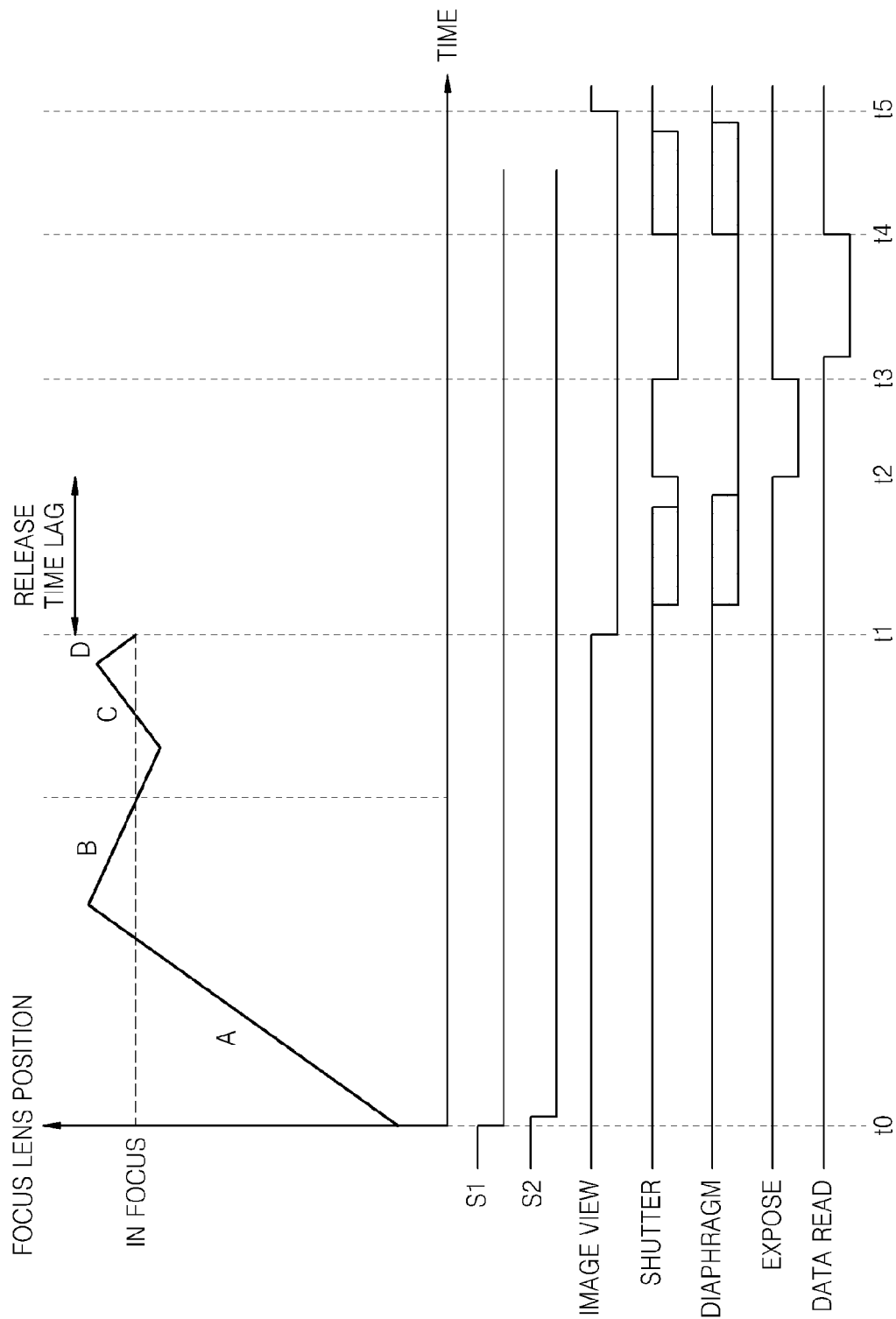
FIG. 5 is a timing diagram indicating a relationship between operation timing of the digital photographing apparatus and a position of a focus lens.

FIG. 5 is a timing diagram indicating the relationship between operation timing of the digital photographing apparatus 1 and the position of the focus lens 104. The horizontal axis indicates time, and the vertical axis sequentially indicates from the top a position of the focus lens 104, a half-press signal S1 of the shutter release button, a full-press signal S2 of the shutter release button, an image view signal IMAGE VIEW for displaying a captured image, a shutter signal SHUTTER, an iris signal DIAPHRAGM, a light exposure signal EXPOSE for the image pickup device 204, and a data read signal. In the current embodiment, a case where the half-press signal S1 and the full-press signal S2 are activated at almost the same time is illustrated.

Referring to FIG. 5, the AF operation starts by the half-press signal S1 at a time t0, thereby driving the focus lens 104 at a high, constant speed. That is, this corresponds to operation A of FIG. 3A. When a peak value of AF evaluation values is detected, the focus lens 104 is driven in a reverse direction at a low, constant speed. That is, this corresponds to operation B of FIG. 3B. The peak value of the AF evaluation values is detected by operation B. Thereafter, operation C of FIG. 3C is performed by reversing the driving direction of the focus lens 104, and finally, operation D of FIG. 3D is performed to remove backlash. Accordingly, the focus lens 104 is at an in-focus position, and the AF operation ends at a time t1.

When the AF operation ends, the display unit 206 stops displaying, and the shutter 203 is closed. Thereafter, the iris 107 is operated from an open state to a proper iris value. When a preparation for an image capture ends, the shutter 203 is opened, thereby starting light exposure at a time t2.

Here, a time between the in-focus time t1 and the time t2 when the shutter 203 is open for light exposure is called a release time lag. In this case, if the full-press signal S2 is activated after in-focus, a time between a time when the full-press signal S2 is activated and the time t2 when the shutter 203 is open is called the release time lag.

When the shutter 203 is open, light exposure of the image pickup device 204 starts at the time t2, and after the light exposure is performed for a proper time, the shutter 203 is closed again at a time t3. Then, electric charges accumulated by the image pickup device 204 are transmitted to the camera controller 209 to read an image signal. Thereafter, the shutter 203 and the iris 107 are opened again at a time t4 to be in an open state at a time t5.

Meanwhile, when a subject moves in an optical axis direction of the image pickup lens, there is a time lag between a time when a focal position is detected and a final in-focus time in operation B of the AF operation, and accordingly, the subject moves during the time lag. Moreover, the subject also moves in an interval in which the release time lag occurs. That is, the subject is not in focus during light exposure. Thus, in embodiments of the invention, such out-of-focus is compensated for. In this case, because a focal position of the moving subject is predicted, this operation is called moving body prediction AF, as will be described now with reference to FIGS. 6 and 7.

Figure 6:
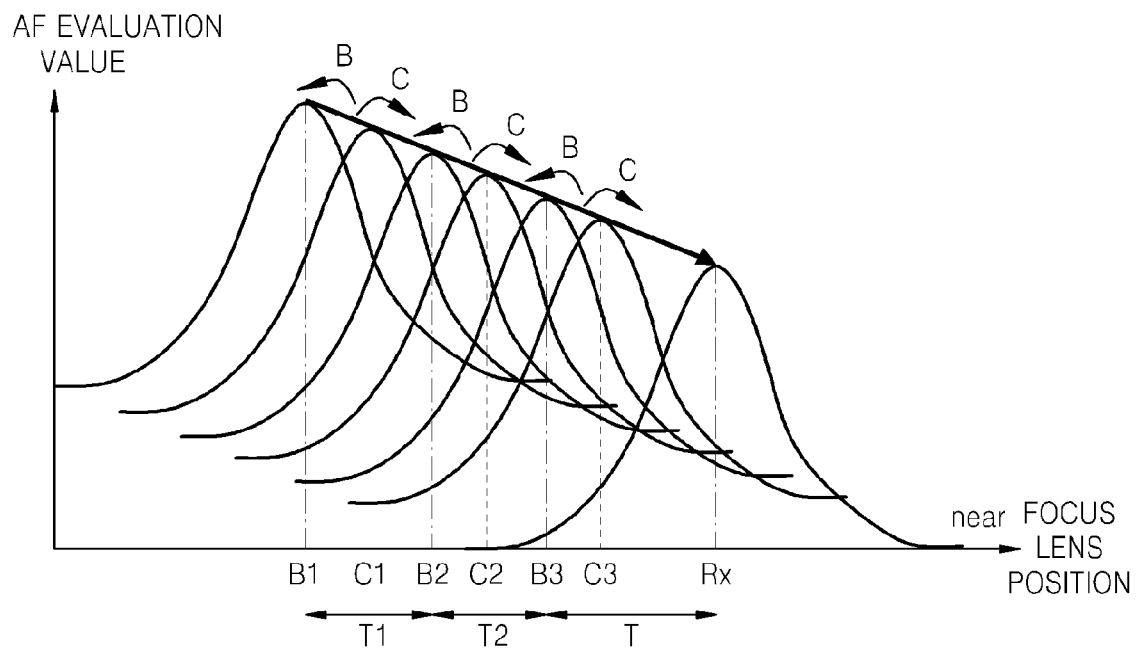
FIG. 6 is a graph that illustrates performing moving body prediction AF, according to an embodiment.

FIG. 6 is a graph to describe a method of performing moving body prediction AF, according to an embodiment of the invention. The horizontal axis indicates a position of the focus lens 104, wherein the right side indicates a near direction. The vertical axis indicates an AF evaluation value. The graph of FIG. 6 shows a distribution of AF evaluation values of a moving body.

Referring to FIG. 6, when the AF operation starts, operation A and operation B are performed, thereby obtaining an initial AF evaluation value peak position. The obtained peak position is B1. Thereafter, operation C is performed, and a peak position is detected by calculating AF evaluation values. However, the peak position detected by operation C is an approximate position obtained by subtracting a backlash amount from an original peak position.

The peak position detected by operation C is almost the same as B1 when a subject does not move. However, when the subject moves, the peak position detected by operation C moves to C1. At this time, if B1 is different from C1+BKL (backlash amount), it is determined that the subject has moved. Thus, operation B is performed again without performing operation D of FIG. 3D. As a result, B2 is detected as a new peak position. That is, it is determined that the subject is a moving body and the peak position has moved to B2.

When the subject moves, an image surface speed of the subject is calculated. When the subject moves at a relatively slow, constant speed, the image surface speed may also approach a constant speed. Thus, a speed Sv of the subject may be calculated from a transition between the peak positions B1 and B2 and a time T1 taken for the transition according to the equation below.

$$Sv=(B1-B2)/T1$$

If it is assumed that the time between when B2 is calculated and when the next peak position of AF evaluation values is T2, a focus compensation value ΔB3 during T2 is obtained by ΔB3=Sv*T2. When the full-press signal S2 is activated to start a shutter release, a compensation value AR due to the release time lag Tr is also obtained by ΔR=Sv*Tr.

By the above-described method, the position Rx of the focus lens 104 at which an AF evaluation value at a light exposure start time is a peak position can be obtained, and the moving body prediction AF is performed by driving the focus lens 104 to the position Rx.

Here, the use of B1 and B2 to obtain Sv is to not include an error due to a backlash into the calculation. When backlash does not occur even though the focus lens 104 is driven in a reverse direction, Sv can be calculated by using the peak position C1 of AF evaluation values that is calculated in operation C, i.e., Sv=(B1−C1)/T1.

Although the speed of a subject is calculated by using only B1 and B2 in the current embodiment, an error exists in each AF evaluation value due to noise. Thus, an average value further including B3 may be used. That is, Sv may be obtained by calculating Sv1=(B1−B2)/T1, Sv2=(B2−B3)/T2, and Sv=(Sv1+Sv2)/2. A compensation value ΔB4 during the AF operation may be obtained from the obtained value Sv by ΔB4=Sv*T3, and the compensation value ΔR due to the release time lag Tr may also be obtained by ΔR=Sv*Tr.

When the speed of a subject is fast, the following equation may be used. If it is assumed that the focal distance of a front side of the image pickup lens is f, the focal distance of a rear side thereof is f', the distance from the focal position of the front side of the image pickup lens to the subject is d, the distance from the focal position of the rear side thereof to an image surface is z, and an image surface position when the subject approaches the digital photographing apparatus 1 at a constant speed is Z(t), the following equation can be obtained.

$$Z(t) = \frac{ff'}{d - \frac{dz}{dt}t}$$

When this equation is approximated to a two-dimensional equation, $Z(t)=At^2+Bt+C$ is obtained. By using the time until the next AF evaluation value is calculated or the time due to the release time lag as a value of t, the moving body prediction AF in a release operation may be performed.

Figure 7:
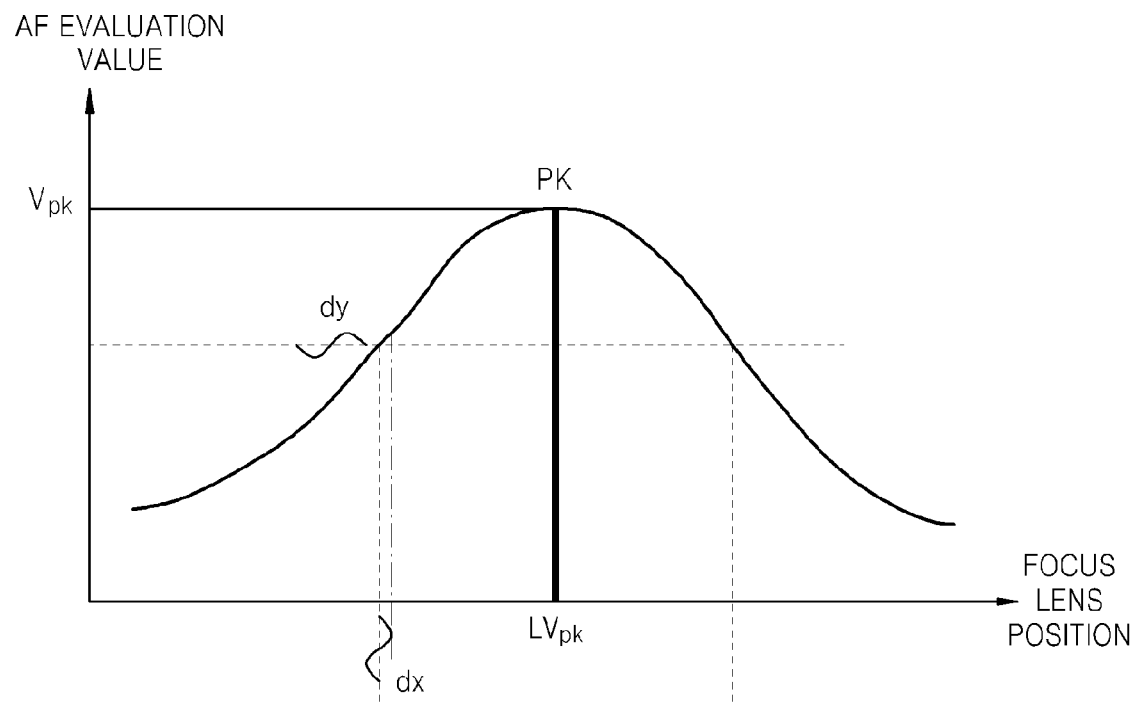
FIG. 7 is a graph to describe a method of performing moving body prediction AF, according to another embodiment.

FIG. 7 illustrates a method of performing moving body prediction AF, according to another embodiment. In FIG. 7, the horizontal axis indicates the position of the focus lens 104, and the vertical axis indicates an AF evaluation value. In the current embodiment, a method of detecting a focus of a moving body by a wobbling operation is used.

Referring to FIG. 7, LVpk denotes a peak position of AF evaluation values, Vpk denotes a peak value of the AF evaluation values, and PK denotes a peak point on the graph. When the focus lens 104 is minutely vibrated by dx in an optical axis direction, an AF evaluation value is also minutely changed by dy. In the current embodiment, a focus of the moving body is detected by using this characteristic.

FIGS. 8A, 8B, 8C, 8D, 8E, 8F, and FIG. 8G are timing diagrams of the moving body prediction AF performed with reference to FIG. 7. In FIGS. 8A, 8B, 8C, 8D, 8E, 8F, and FIG. 8G, light exposure by the image pickup device 204 is performed once a field (1VD), and the wobbling operation is performed in a fourth period.

FIG. 8A is a timing diagram of a vertical synchronization signal VD, FIG. 8B is a timing diagram of the position of the focus lens 104, FIG. 8C is a timing diagram of light exposure, FIG. 8D is a timing diagram of reading an image signal, FIG. 8E is a timing diagram of the read timing signal, FIG. 8F is a timing diagram of reading an AF evaluation value, and FIG. 8G is a timing diagram of the lens driving control signal.

First, the focus lens 104 moves from a far direction to a near direction by, for example, 3Fδ, where F denotes the iris value and δ denotes the depth-of-focus value. An image signal is acquired even when the focus lens 104 is moving. Thereafter, the focus lens 104 stops at a near position, and an image signal is acquired. Thereafter, the focus lens 104 moves in the far direction and stops. The above-described operations are performed in a one-field unit and completed by a total of 4 fields.

When the image signal reading by the light exposure of FIG. 8C is performed, an integral time varies according to brightness. In addition, an image signal acquired during e1 is read at timing VR2 of the next field. Each of the operations is achieved within one field.

Thereafter, an AF evaluation value is acquired at timing AF3 of the next field, and the control signal is generated at timing LD4 of the next field by using the AF evaluation value acquisition result.

The above-described operations correspond to the wobbling operation, and in-focus is achieved at a contrast peak position using the above-described method.

In the current embodiment, the moving body prediction AF described with reference to FIG. 6 is performed by using the wobbling operation. That is, the peak positions B1 and B2 are obtained by performing the wobbling operation.

Hereinafter, an operation of the digital photographing apparatus 1 to which the moving body prediction AF is applied will be described.

Figure 9:
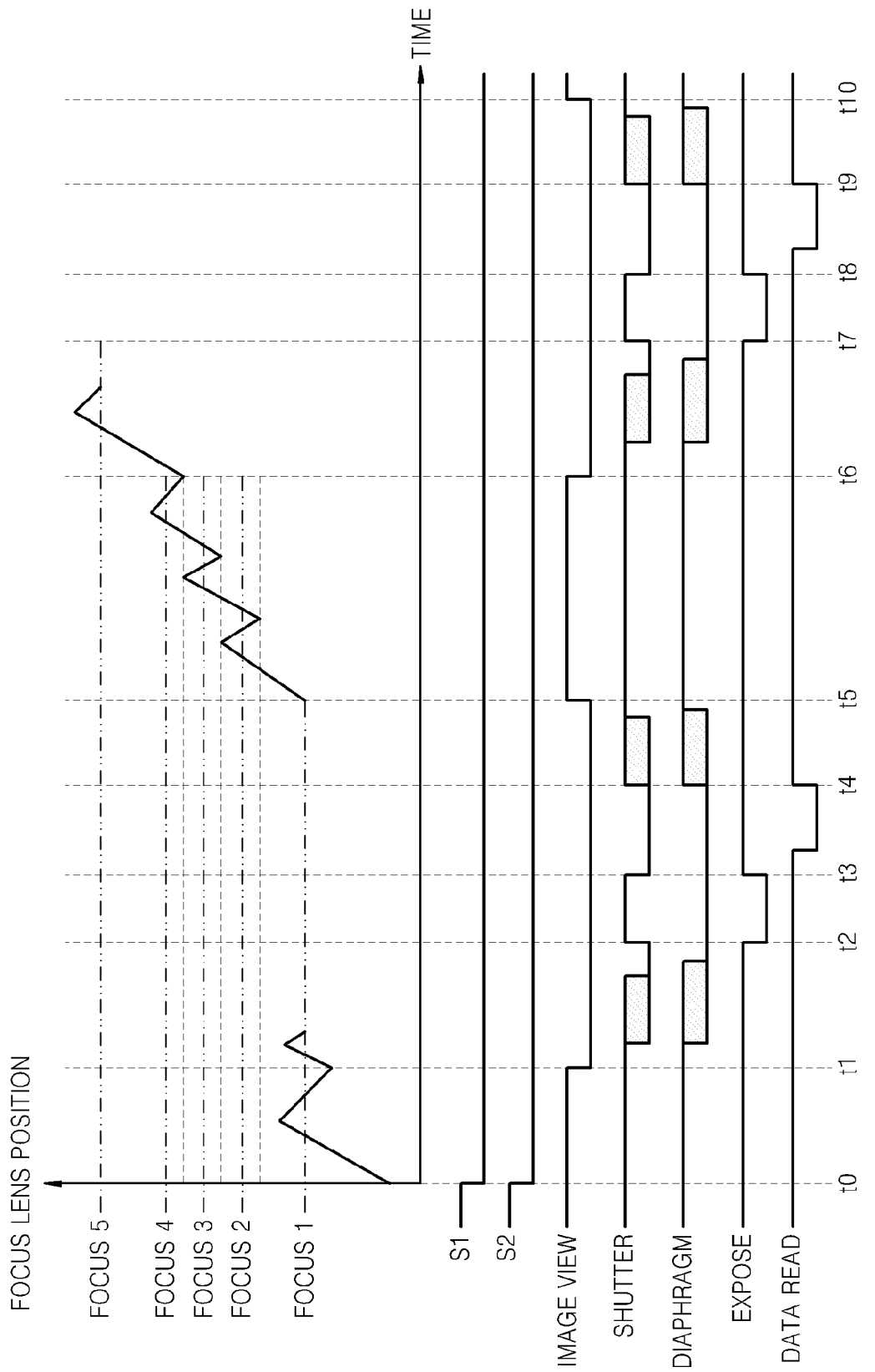
FIG. 9 is a timing diagram indicating a moving body compensation driving method according to an embodiment.

FIG. 9 is a timing diagram indicating a moving body compensation driving method according to an embodiment of the invention. In the timing diagram of FIG. 9, the horizontal axis and the vertical axis are respectively the same as those in FIG. 5. In addition, the half-press signal S1 and the full-press signal S2 are activated at the same time. However, it is assumed that the subject is moving.

Referring to FIG. 9, the AF operation starts by the activation of the half-press signal S1 at a time t0, thereby driving the focus lens 104 at a high, constant speed to perform operation A of FIG. 3A. When a peak value of AF evaluation values is detected, the focus lens 104 is driven in a reverse direction at a low, constant speed to perform operation B of FIG. 3B. The peak value of the AF evaluation values is detected by operation B.

Thereafter, operation C of FIG. 3C is performed by reversing the driving direction of the focus lens 104. In the current embodiment, during operation C of FIG. 3C, a capture preparation operation starts at a time t1. That is, the shutter 203 in a usual open state is changed to a closed state, and the iris 107 is controlled. An interval between t1 and t2 for driving the shutter 203 and the iris 107 is a light exposure preparation interval. In addition, the display unit 206 stops displaying an image. During the capture preparation operation, operation C of FIG. 3C and operation D of FIG. 3D for removing a backlash are performed. When the operation D of FIG. 3D ends, the AF operation ends.

When the capture preparation operation ends at a time t2, the shutter 203 is open, thereby starting light exposure of the image pickup device 204. That is, an image is captured. Thereafter, the shutter 203 is closed at a time t3. Thereafter, information of the image pickup device 204 is read. After reading the information, the shutter 203 and the iris 107 are open again at a time t4.

After the series of operations, in a case of continuous photographing, the next photographing starts at a time t5, wherein the digital photographing apparatus 1 performing AF first of all performs the AF operation at this time. In the current embodiment, a peak position detection operation is performed three times. Calculation of the moving speed of the subject according to detecting the peak position three times may be performed using the method described with reference to FIG. 6. Of course, when the subject does not move, the AF operation may be completed by one peak position detection operation.

In detail, an in-focus position in image capturing is predicted by performing the moving body prediction AF before a light exposure preparation interval, i.e., an interval between t5 and t6. Thereafter, compensation driving of the focus lens 104 towards an in-focus prediction position FOCUS5 is performed by performing moving body compensation driving in the light exposure preparation interval, i.e., an interval between t6 and t7. Specifically, the moving body compensation driving may be performed until driving of the shutter 203 to a closed state is completed. In the current embodiment, the moving speed of the subject is calculated from information regarding lens positions FOCUS2 to FOCUS4 and time information thereof, the lens position FOCUS5 is calculated from the moving speed of the subject, and operations C and D as the AF operation are performed towards the calculated lens position FOCUS5.

Unless the continuous photographing ends, the above-described operations are repeated. The wobbling operation may be performed to detect a peak position in the continuous photographing.

In the current embodiment, driving the focus lens 104 to detect a peak position when the shutter 203 is in the usual open state during the continuous photographing is performed by a combination of operation A and operation B at a low speed as the AF operation. Alternatively, the driving of the focus lens 104 may be performed by a combination of operation B and operation C.

When the moving speed Sv0 of the subject has been detected before the first image of the continuous photographing is captured and the moving speed Sv0 is slow, an average value Sv=(Sv0+Sv1)/2 of the moving speed Sv0 and the moving speed Sv1 acquired after the first image is captured is obtained and may be used for the moving body prediction AF and the moving body compensation driving from a second image capture. An average value of moving speeds of a subject is performed because, when the subject is far away and the magnification on the image surface is low, the image surface speed is also slow, and accordingly an error may occur in speed detection. Furthermore, when continuous photographing of a subject of which an image surface speed is slow is continuously performed, an average value Sv=(Sv1+Sv2)/2 of the moving speed Sv1 in a previous capture and the moving speed Sv2 in a current capture may be used for the moving body prediction AF and the moving body compensation driving.

Figure 10:
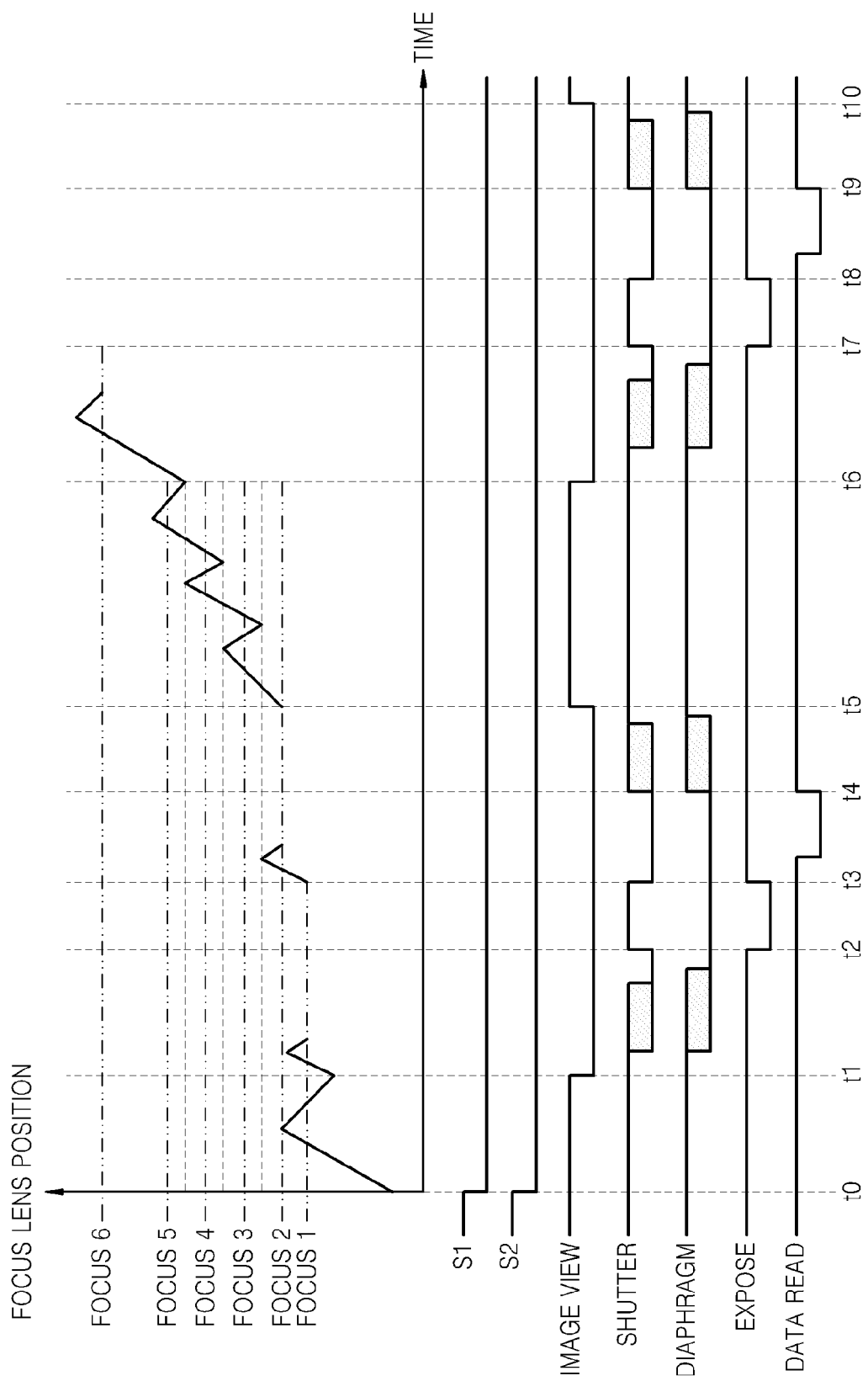
FIGS. 10 to 14 are timing diagrams indicating a moving body compensation driving method according to other embodiments.

FIG. 10 is a timing diagram indicating a moving body compensation driving method according to another embodiment of the invention. The current embodiment will be described with respect to how it differs from the embodiment of FIG. 9.

Referring to FIG. 10, in the current embodiment, when it is detected that a subject is moving before light exposure for capturing a first image of continuous photographing, immediately after the light exposure for capturing the first image is completed at the time t3, the moving body compensation driving for capturing a second image of the continuous photographing is performed by using an already acquired moving speed of the subject The focus lens 104 is driven from the lens position FOCUS1 adjusted to capture the first image to the lens position FOCUS2 in an interval in which the shutter 203 starts to transition to the usual open state after the light exposure for capturing the first image is completed, i.e., an interval between t3 and t4. In this case, the lens position FOCUS2 of the focus lens 104 is obtained as follows.

From the moving speed Sv of the subject, which is acquired until the image of the continuous photographing, and a time Tf from a light exposure start time to a time for driving the shutter 203 to the usual open state, a moving amount $\Delta R0$ of the subject for Tf is obtained. An equation to obtain $\Delta R0$ is $\Delta R0 = Sv*Tf$. Then, the lens position FOCUS2 is obtained by FOCUS2=FOCUS1+R0.

As described above, by performing the moving body compensation driving in advance of the moving body prediction AF according to the embodiment of FIG. 9, an AF operation time after the first image of the continuous photographing is captured may be reduced.

Figure 11:
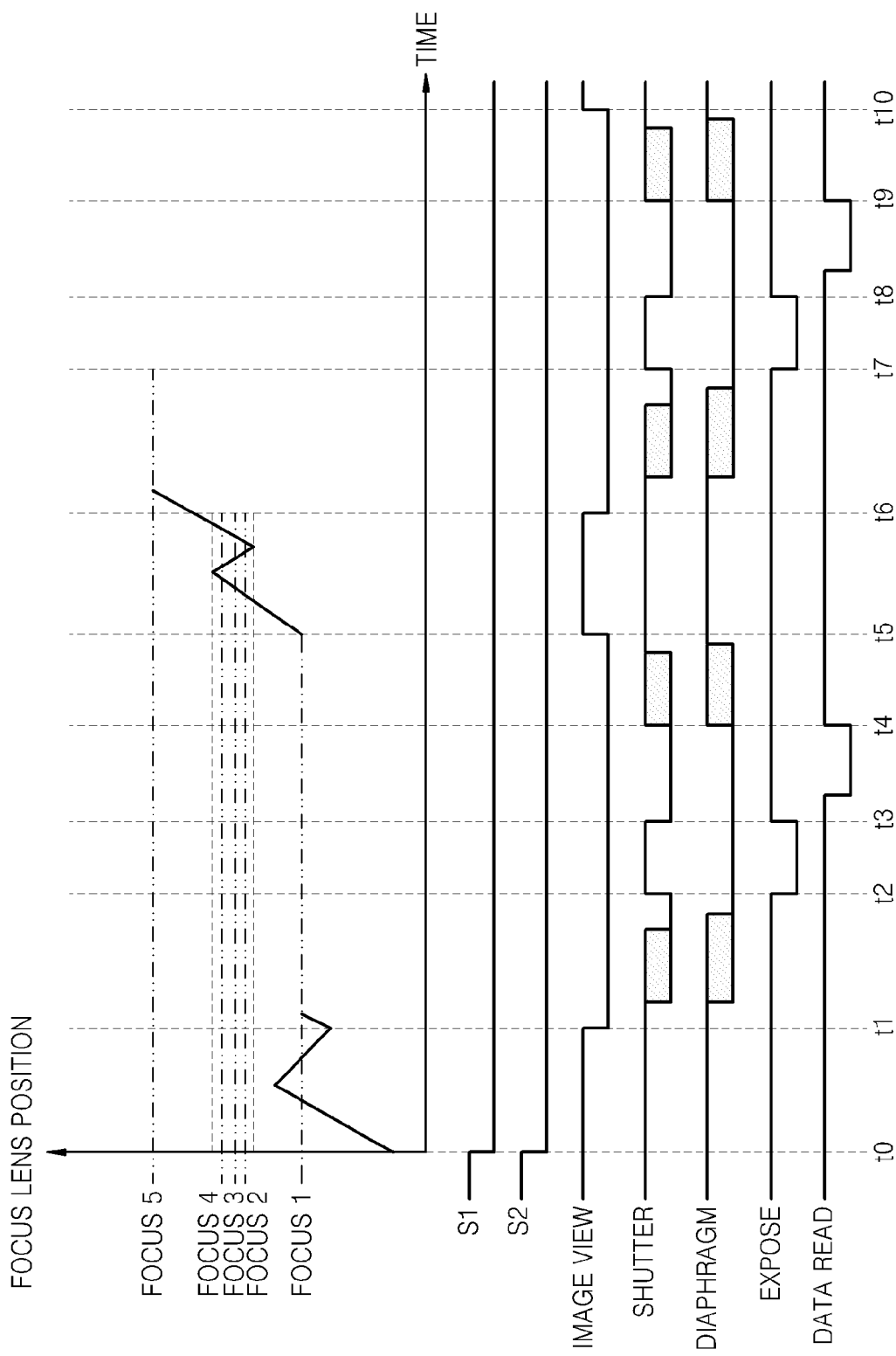

FIG. 11 is a timing diagram indicating a moving body compensation driving method according to another embodiment of the invention. In the current embodiment, an actuator with no backlash by using VCM or the like is used, and a system with no backlash even in position detection by detecting a position of the focus lens 104 optically is used.

In the current embodiment, peak positions acquired in both directions of the operations B and C in the AF operation are used to detect the moving speed of a subject. That is, the moving speed of the subject is obtained by the above-described equation $Sv=(B1-C1)/T1$. Here, a dashed line between FOCUS1 and FOCUS2 and a dashed line between FOCUS4 and FOCUS5 are lines indicating positions at which the focus lens 104 changes its moving direction and are irrelevant to the focal position. In addition, it is reconfirmed during operation B that the subject is a moving body, and a capture preparation operation starts. In operation B, the moving body compensation driving is performed, thereby moving the focus lens 104 to a focal position in image capturing.

Because there is no backlash in the current embodiment, operation D for removing the backlash is omitted.

Figure 12:
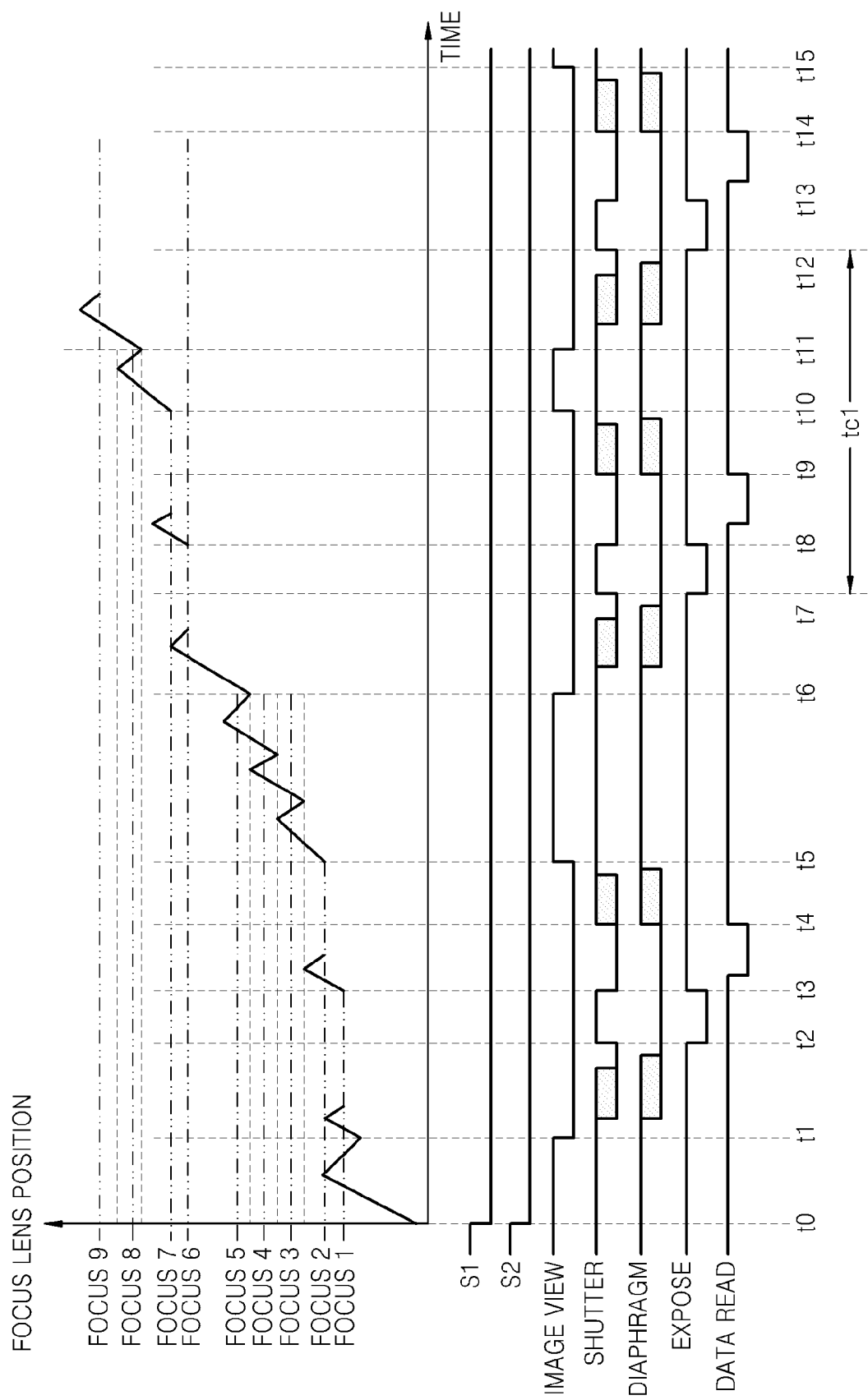

FIG. 12 is a timing diagram indicating a moving body compensation driving method according to another embodiment of the invention. In the current embodiment, although the moving body compensation driving does not have to be performed in capturing a first image of continuous photographing because an initial moving speed of a subject is slow, it is predicted after capturing the first image that a position of the subject is over a depth of field (DOF), causing a change of an image on an image surface.

Referring to FIG. 12, a first image of continuous photographing is captured in an interval between t0 and t3 without performing the moving body compensation driving. The moving body compensation driving is performed in an interval between t3 and t4 to capture the next image in an interval in which AF evaluation values cannot be calculated immediately after capturing the first image, i.e., in a state where light does not arrive at the image pickup device 204. In an interval in which AF evaluation values can be calculated, a scanning operation according to a back-and-forth operation is performed, for example, three times, and the moving speed of the subject is detected from a change of a peak position of AF evaluation values in an interval between t5 and t6. Thereafter, the moving body compensation driving is performed in an interval between t6 and t7 before a second image of the continuous photographing is captured.

Even if the actual moving speed of the subject is constant, an image surface speed of the object is faster than before from capturing a third image of the continuous photographing. Thus, to respond to this fast speed, the back-and-forth scanning operation for detecting a peak position is limited to one time. Then, a moving speed of the subject may be obtained from a peak position acquired in a previous capturing operation and a peak position acquired by one back-and-forth scanning operation in a current capturing operation.

When a fourth image of the continuous photographing is captured, the moving speed of the subject is obtained from the peak position acquired by the one back-and-forth scanning operation in the third image capturing operation and a peak position acquired by one back-and-forth scanning operation in a current capturing operation. For example, if it is assumed that the time between capturing operations in continuous photographing is tc1 and peak positions acquired by one back-and-forth scanning operation in the capturing operations are Bc1 and Bc2, the moving speed Scv of a subject may be obtained by Scv=(Bc1−Bc2)/tc1.

Accordingly, by reducing the time taken for the moving body prediction AF and the moving body compensation driving, the continuous photographing speed may be increased.

Although the moving body prediction AF operation is changed from three back-and-forth scanning operations to one back-and-forth scanning operation in the middle of the moving body prediction AF in the current embodiment, the invention is not limited thereto. For example, when the speed of continuous photographing is important, if it is determined that the subject is moving, a peak position is obtained by performing only one back-and-forth scanning operation, and in capturing from a third image, the moving speed of the subject may be obtained from a plurality of peak positions acquired by the one back-and-forth scanning operation.

In addition, when the subject moves at a low speed on an image surface during continuous photographing, the moving speed of the subject may be obtained from peak positions acquired by performing a back-and-forth scanning operation two or three times, and when the subject moves at a high speed on the image surface during the continuous photographing, the number of back-and-forth scanning operations may be reduced according to the moving speed of the subject, such that a peak position is acquired by performing the back-and-forth scanning operation once.

Figure 13:
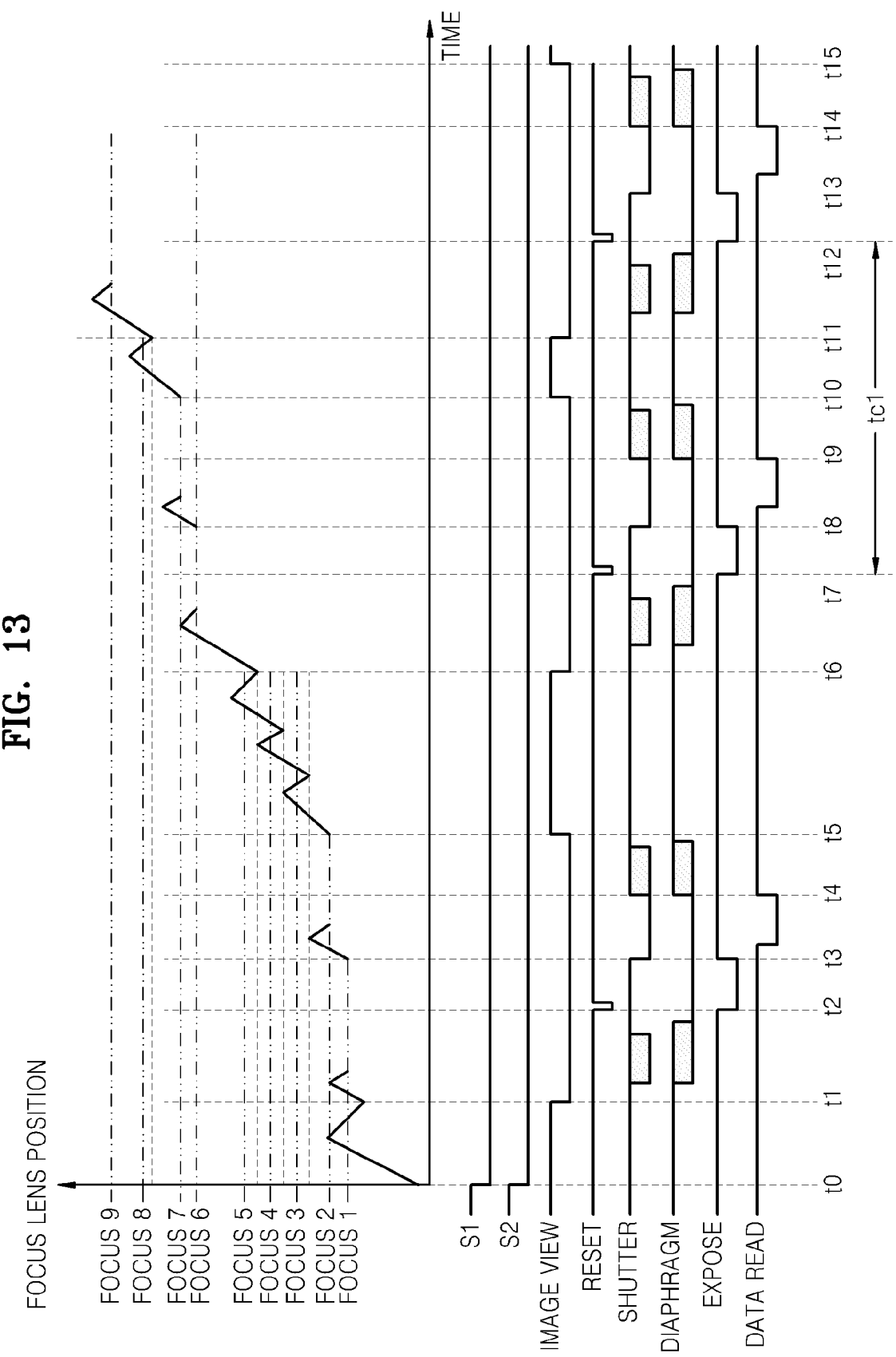

FIG. 13 is a timing diagram indicating a moving body compensation driving method according to another embodiment of the invention. In the current embodiment, an electronic front curtain shutter is used instead of a mechanical shutter used in FIG. 12. Because the electronic front curtain shutter is well-known technology, a detailed description thereof is omitted, and the current embodiment will be described with respect to how it differs from the embodiment of FIG. 12.

Referring to FIG. 13, the image pickup device 204 transmits an image signal generated by an operation of selectively reading electric charges to the display unit 206 to display a live-view image. The AF operation starts by the half-press signal S1, and the capture preparation operation is performed in a light exposure preparation interval by the full-press signal S2 (between t0 and t2). That is, the display unit 206 stops displaying according to the operation of selectively reading electric charges, the shutter 203 is closed, and the iris 107 is controlled. At this time, because only a rear curtain is a mechanical shutter in the current embodiment, the rear curtain is changed to a closed state. However, because the rear curtain is a shutter for blocking light after a front curtain is driven, the closed state of the rear curtain indicates a state of transitioning to a position immediately before light is blocked.

Thereafter, light exposure starts by driving the front curtain. Because the front curtain is an electronic front curtain in the current embodiment, a reset timing signal RESET is applied to the image pickup device 204, thereby starting the light exposure at the time t2. The light exposure replaces a mechanical front curtain by sequentially resetting the image pickup device 204 from the top to the bottom. At the timing when the light exposure ends, the rear curtain is driven, thereby blocking the light incident on the image pickup device 204. Electric charges accumulated by the image pickup device 204 are read, and the image pickup device 204 is blocked from light by the rear curtain during the reading.

After the data reading ends, the rear curtain is in an open state again, and a scanning operation for acquiring AF evaluation values by receiving light in the image pickup device 204 is performed. Because a method of obtaining a moving speed of a subject thereafter is the same as that of FIG. 12, a detailed description thereof is omitted.

Figure 14:
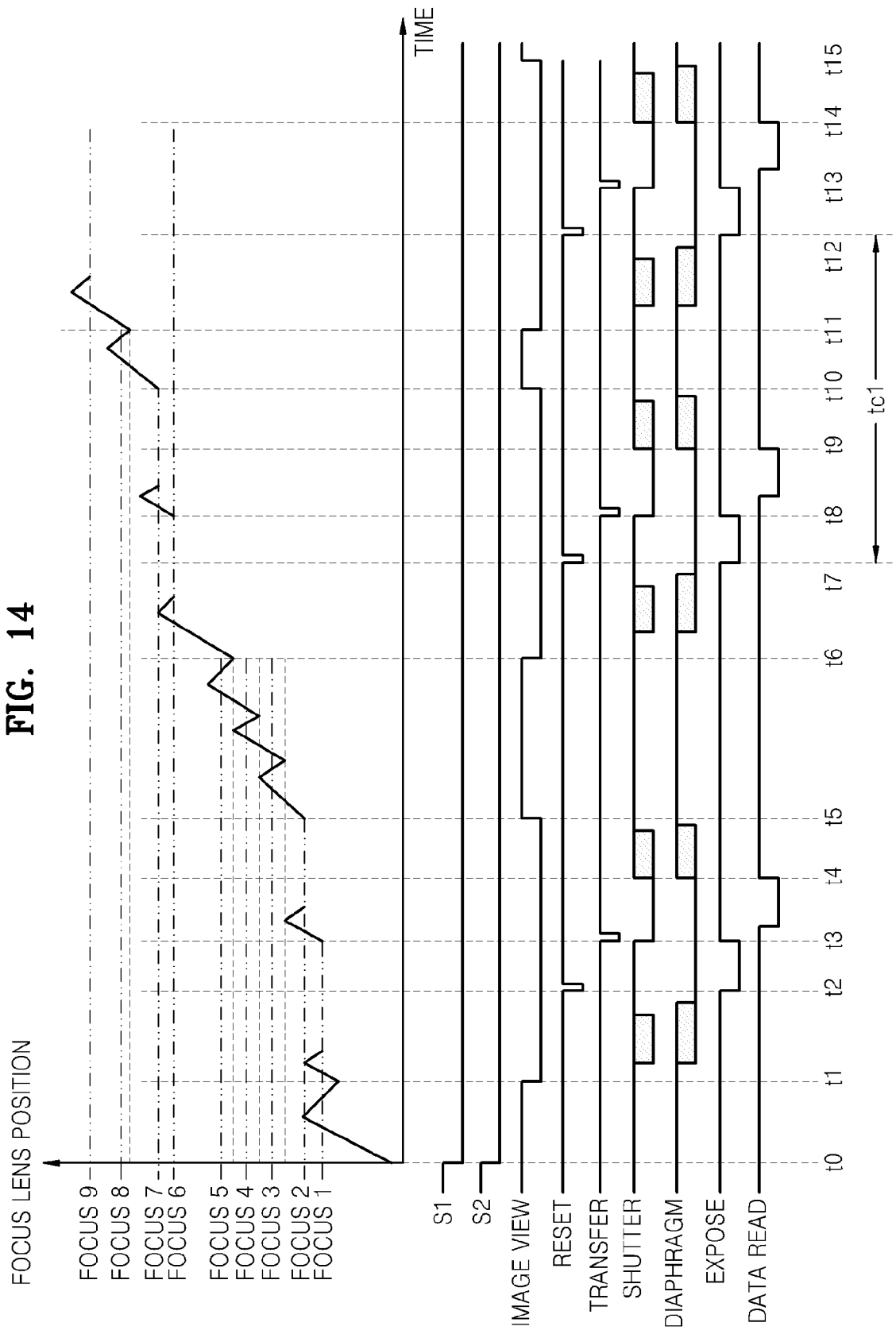

FIG. 14 is a timing diagram indicating a moving body compensation driving method according to another embodiment of the invention. In the current embodiment, a global shutter in which a shutter function is included in the image pickup device 204 is used instead of a mechanical shutter used in FIG. 12. The global shutter starts light exposure by simultaneously resetting electric charges with respect to a whole screen and ends the light exposure by simultaneously transmitting accumulated electric charges to the light non-exposure part with respect to the whole screen. Because the global shutter is well-known technology, a detailed description thereof is omitted, and the current embodiment will be described with respect to how it differs from the embodiment of FIG. 12.

Referring to FIG. 14, the image pickup device 204 transmits an image signal generated by an operation of selectively reading electric charges to the display unit 206 to display a live-view image. The AF operation starts by the half-press signal S1, and the capture preparation operation is performed in a light exposure preparation interval by the full-press signal S2 (between t0 and t2). That is, the display unit 206 stops displaying according to the operation of selectively reading electric charges, and the iris 107 is controlled.

Thereafter, light exposure starts by driving a front curtain. Because the front curtain is an electronic front curtain in the current embodiment, a reset timing signal RESET is applied to the image pickup device 204, thereby starting the light exposure at the time t2. In detail, the light exposure starts by simultaneously applying the reset timing signal RESET to a whole screen of the image pickup device 204. The light exposure ends by simultaneously applying an electric charge transfer signal TRANSFER to the whole screen of the image pickup device 204 at a time t3.

Electric charges accumulated by the image pickup device 204, i.e., an image signal, are read by a data read signal DATA READ. While the data reading is being performed, a gate is closed so that a new electric charge does not flow to an electric charge storage unit (not shown) in which transmitted electric charges are stored even if the image pickup device 204 receives light. That is, the image pickup device 204 is in the same state as a light-blocked state.

When the reading of data from the electric charge storage unit ends, continuous photographing is performed by repeatedly resetting and transmitting electric charges. Because a method of obtaining the moving speed of a subject thereafter is the same as that of FIG. 12, a detailed description thereof is omitted.

[Method of Controlling the Digital Photographing Apparatus 1]

Figure 15:
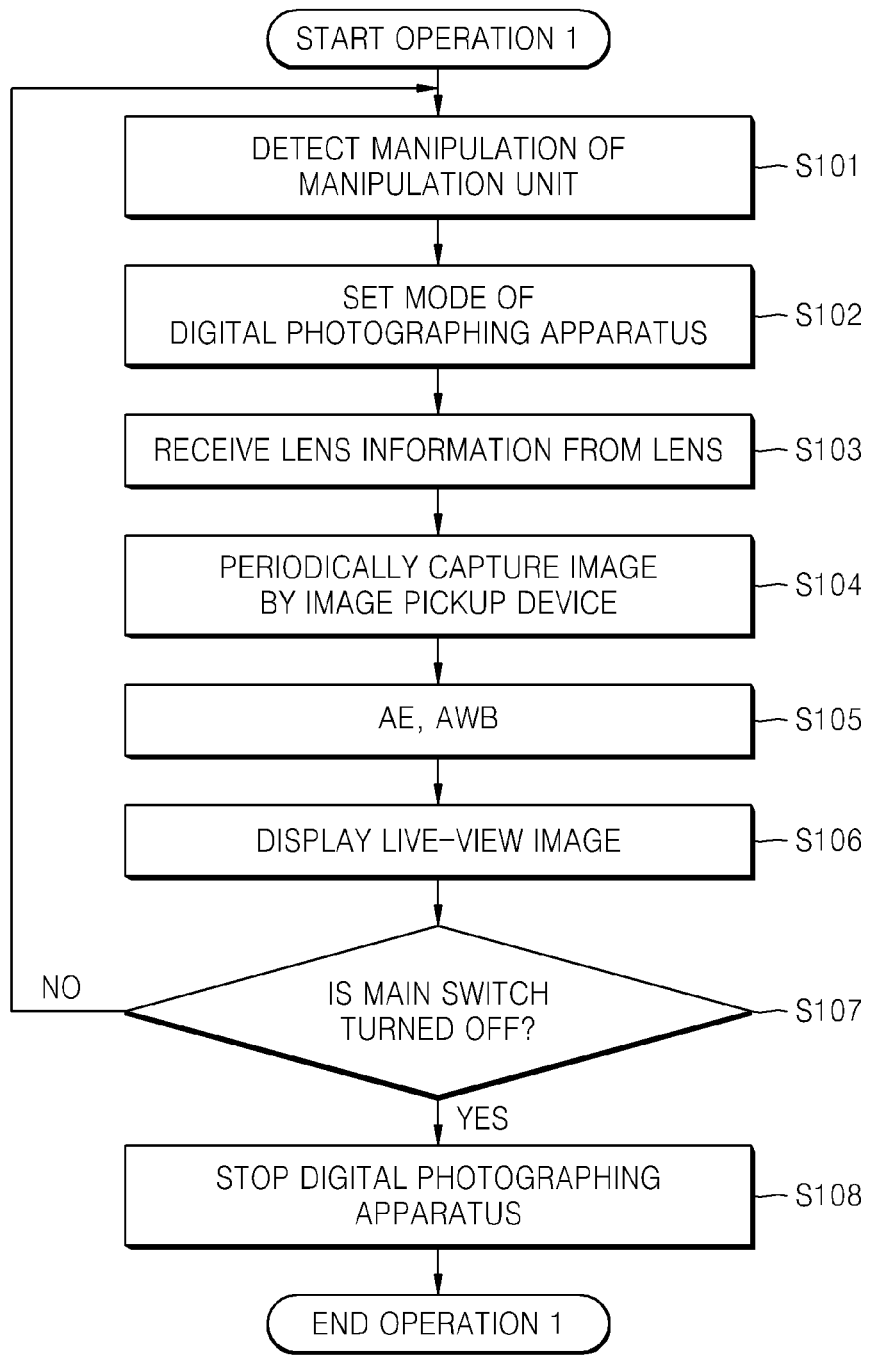
FIG. 15 is a flowchart illustrating a method of controlling the digital photographing apparatus, according to an embodiment.

FIG. 15 is a flowchart illustrating a method of controlling the digital photographing apparatus 1, according to an embodiment of the present invention. FIG. 15 illustrates an operation (operation 1) of starting the digital photographing apparatus 1.

Referring to FIG. 15, when the digital photographing apparatus 1 starts operating by turning the main switch of the digital photographing apparatus 1 on, a manipulation of the manipulation unit 207 is detected in operation S101. According to the detection, a mode of the digital photographing apparatus 1 is set in operation S102. In operation S103, lens information for operating the digital photographing apparatus 1 is received from the lens 100 and stored. The lens information includes various kinds of lens-unique parameters and may be information for controlling AF, AE, AWB, and image quality. While the lens information is received from the lens 100 in the digital photographing apparatus 1 using the exchangeable lens 100, as shown in FIG. 1, operation S103 may be skipped in digital photographing apparatuses such as a camera or other device with a non-exchangeable lens.

In operation S104, the image pickup device 204 starts periodic photographing. In operation S105, the image pickup device 204 performs light measurement to calculate AE and AWB. In operation S106, periodically captured images are displayed as live-view images.

It is determined in operation S107 whether the main switch is turned off. If the main switch is not turned off, operations S101 to S106 are repeated. Otherwise, if the main switch is turned off, the operation of the digital photographing apparatus 1 stops in operation S108. Accordingly, operation 1 ends.

Figure 16:
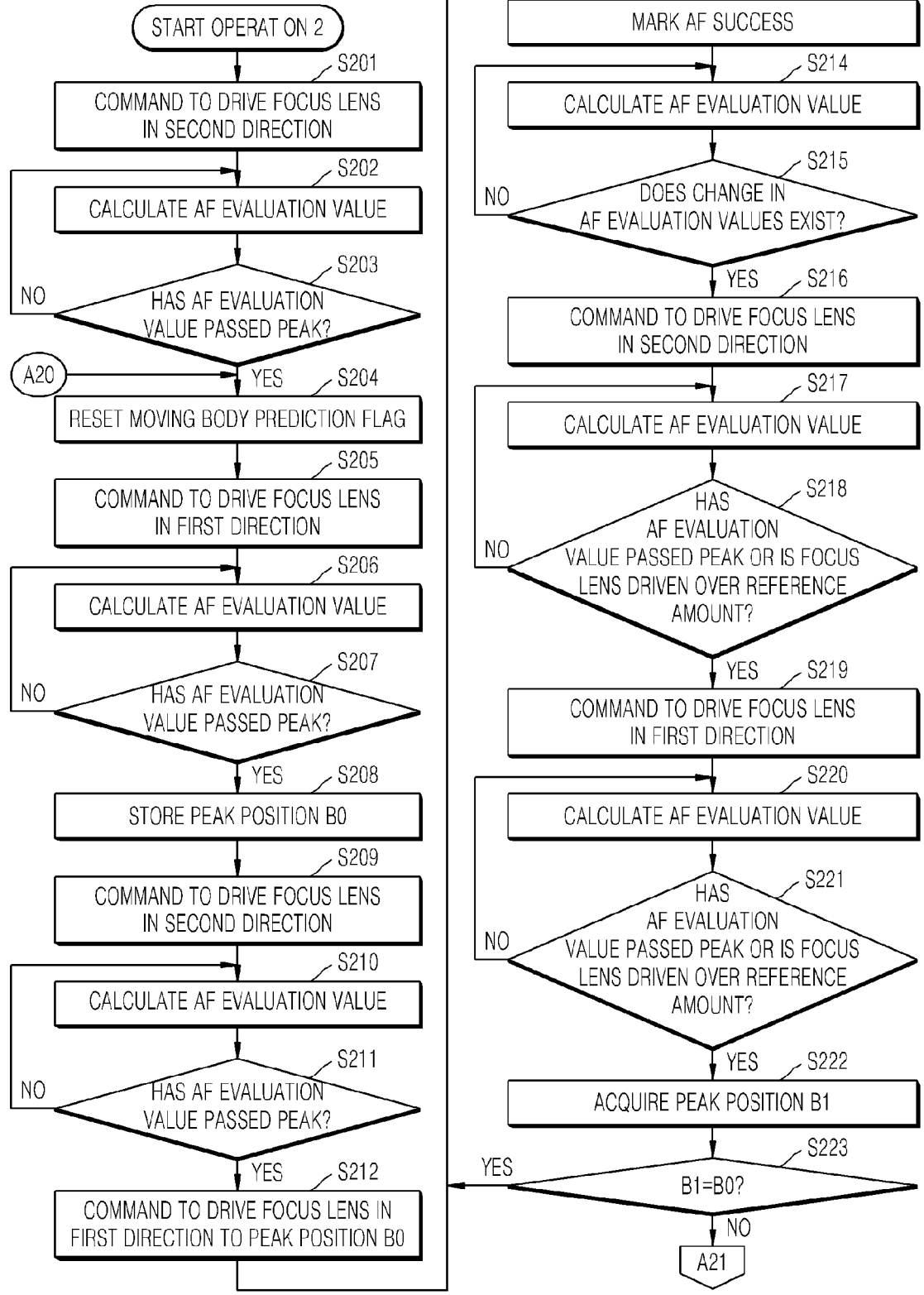
FIGS. 16 and 17 are flowcharts illustrating a method of controlling the digital photographing apparatus, according to another embodiment.
Figure 17:
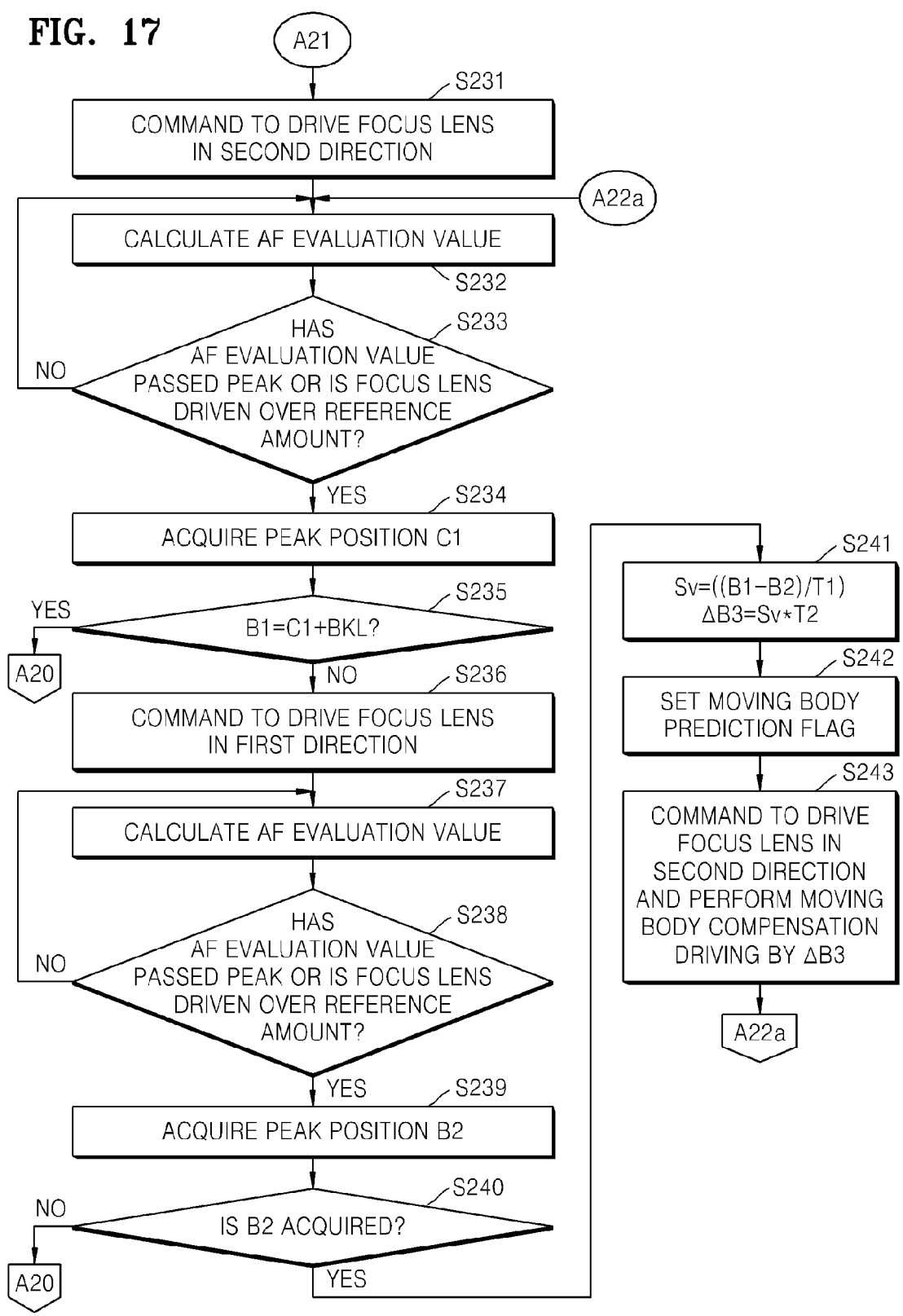

FIGS. 16 and 17 are flowcharts illustrating a method of controlling the digital photographing apparatus 1, according to another embodiment of the invention. FIGS. 16 and 17 illustrate an operation (operation 2) performed by applying the half-press signal S1 due to a halfway press of the shutter release button during a live-view display.

Referring to FIGS. 16 and 17, when the half-press signal S1 is applied, the digital photographing apparatus 1 commands to drive the focus lens 104 in a second direction at a high, constant speed by an interrupt operation in operation S201. That is, operation A of the AF operation is performed. In operation S202, an AF evaluation value is calculated while driving the focus lens 104. It is determined in operation S203 whether the AF evaluation value has passed a peak. If the AF evaluation value has not passed the peak, the digital photographing apparatus 1 proceeds back to operation S202. Otherwise, if the AF evaluation value has passed the peak, a moving body prediction flag is reset in operation S204. This is an initial setting value of the moving body prediction flag.

In operation S205, the digital photographing apparatus 1 commands to drive the focus lens 104 in a first direction at a low, constant speed by changing the driving direction. That is, operation B of the AF operation is performed. In operation S206, an AF evaluation value is calculated. Then, it is determined in operation S207 whether the AF evaluation value has passed a peak. If the AF evaluation value has not passed the peak, the digital photographing apparatus 1 proceeds back to operation S206. Otherwise, if the AF evaluation value has passed the peak, a peak position B0 is stored in operation S208.

In operation S209, the digital photographing apparatus 1 commands to drive the focus lens 104 in the second direction at a high, constant speed again to remove backlash. That is, operation C of the AF operation is performed. In operation S210, an AF evaluation value is calculated. Then, it is determined in operation S211 whether the AF evaluation value has passed a peak. If the AF evaluation value has not passed the peak, the digital photographing apparatus 1 proceeds back to operation S210. Otherwise, if the AF evaluation value has passed the peak, the focus lens 104 is driven towards the peak position B0 in the first direction at a high speed in operation S212. That is, operation D of the AF operation is performed. At this time, an AF evaluation value does not have to be calculated. The AF operation is completed by the above-described procedures, and it is indicated in operation S213 that the AF operation has successfully ended.

Even after the AF operation successfully ends, AF evaluation values are continuously calculated in operation S214. Then, it is determined in operation S215 whether a change in the AF evaluation values exists. If a change in the AF evaluation values does not exist, the digital photographing apparatus 1 maintains the focus lens 104 in the current state and waits for the full-press signal S2 according to a full press of the shutter release button while repeatedly performing operation S214. Otherwise, if a change in the AF evaluation values exists, it is determined that the subject has been changed. That is, it is determined that the subject is possibly moving.

If it is determined in operation S215 that a change in the AF evaluation values exists, the digital photographing apparatus 1 commands to drive the focus lens 104 in the second direction at a low, constant speed in operation S216. In operation S217, an AF evaluation value is calculated while driving the focus lens 104. It is determined in operation S218 whether the AF evaluation value has passed a peak while driving the focus lens 104 within a reference amount or whether the focus lens 104 has been driven over the reference amount.

If the above conditions are not satisfied, the digital photographing apparatus 1 proceeds back to operation S217. Otherwise, if any of the above conditions is satisfied, the digital photographing apparatus 1 commands to drive the focus lens 104 in the first direction at a low, constant speed in operation S219. In operation S220, an AF evaluation value is calculated while driving the focus lens 104.

It is determined in operation S221 whether the AF evaluation value has passed a peak while driving the focus lens 104 within the reference amount or whether the focus lens 104 has been driven over the reference amount, as in operation S218.

If the above conditions are not satisfied, the method proceeds back to operation S220. Otherwise, if any of the above conditions is satisfied, the peak position B1 shown in FIG. 6 is acquired in operation S222. It is determined in operation S223 whether B0 is identical to B1. If B0 is identical to B1 the method proceeds back to operation S213. Otherwise, if B0 is different from B1 or if no peak is acquired, the digital photographing apparatus 1 proceeds to operation A21.

If B0 is different from B1 or no peak is acquired in operation S223, the digital photographing apparatus 1 commands to drive the focus lens 104 in the second direction at a low, constant speed in operation S231. In operation S233, an AF evaluation value is calculated again. It is determined in operation S233 whether the AF evaluation value has passed a peak while driving the focus lens 104 within the reference amount or whether the focus lens 104 has been driven over the reference amount, as in operation S218. If the above conditions are not satisfied, the digital photographing apparatus 1 proceeds back to operation S232. Otherwise, if any of the above conditions is satisfied, the peak position C1 shown in FIG. 6 is acquired in operation S234.

It is determined in operation S235 whether B1 is identical to a sum of C1 and an error BKL due to backlash. If B1 is identical to the sum of C1 and the error BKL, the digital photographing apparatus 1 determines that the subject has not moved and proceeds back to operation S204. Here, B1 does not have to be numerically identical to the sum of C1 and the error BKL, and if B1 is substantially the same as the sum of C1 and the error BKL or if a difference between B1 and the sum of C1 and the error BKL is within a predetermined error range, it may be determined that B1 is identical to the sum of C1 and the error BKL. Otherwise, if B1 is different from the sum of C1 and the error BKL, the digital photographing apparatus 1 commands to drive the focus lens 104 in the first direction at a low, constant speed in operation S236. In operation S237, an AF evaluation value is calculated while driving the focus lens 104.

It is determined in operation S238 whether the AF evaluation value has passed a peak while driving the focus lens 104 within the reference amount or whether the focus lens 104 has been driven over the reference amount, as in operation S218. If the above conditions are not satisfied, the digital photographing apparatus 1 proceeds back to operation S237. Otherwise, if any of the above conditions is satisfied, the peak position B2 shown in FIG. 6 is acquired in operation S239.

It is determined in operation S240 whether B2 is acquired. If B2 is not acquired, it is determined that the possibility that the digital photographing apparatus 1 is in a panning state is high, and the digital photographing apparatus 1 proceeds back to operation S204 to perform the AF operation again. Otherwise, if B2 is acquired, it is determined that the subject is moving, and the moving speed of the subject and a compensation amount for the moving body compensation driving are calculated in operation S241. The moving speed of the subject and the compensation amount may be obtained by $Sv=(B1-B2)/T1$ and $AB3=Sv*T2$, respectively.

In operation S242, the moving body prediction flag is set. In operation S243, the digital photographing apparatus 1 commands to drive the focus lens 104 in the second direction at a low speed, wherein the moving body compensation driving is performed by $\Delta B3$. Thereafter, the digital photographing apparatus 1 proceeds back to operation S232.

Figure 18:
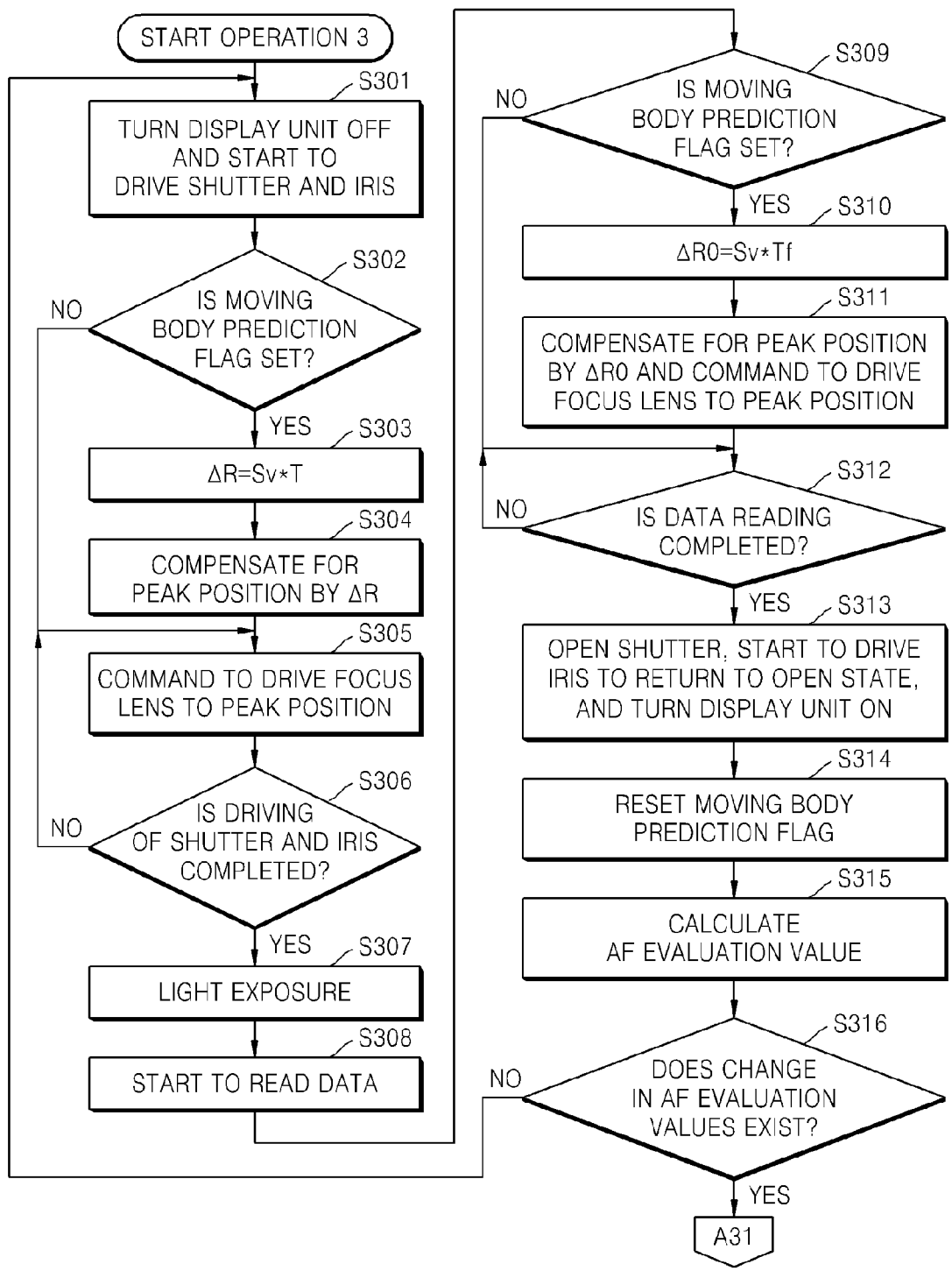
FIGS. 18, 19A, and 19B are flowcharts illustrating a method of controlling the digital photographing apparatus, according to another embodiment.
Figure 19A:
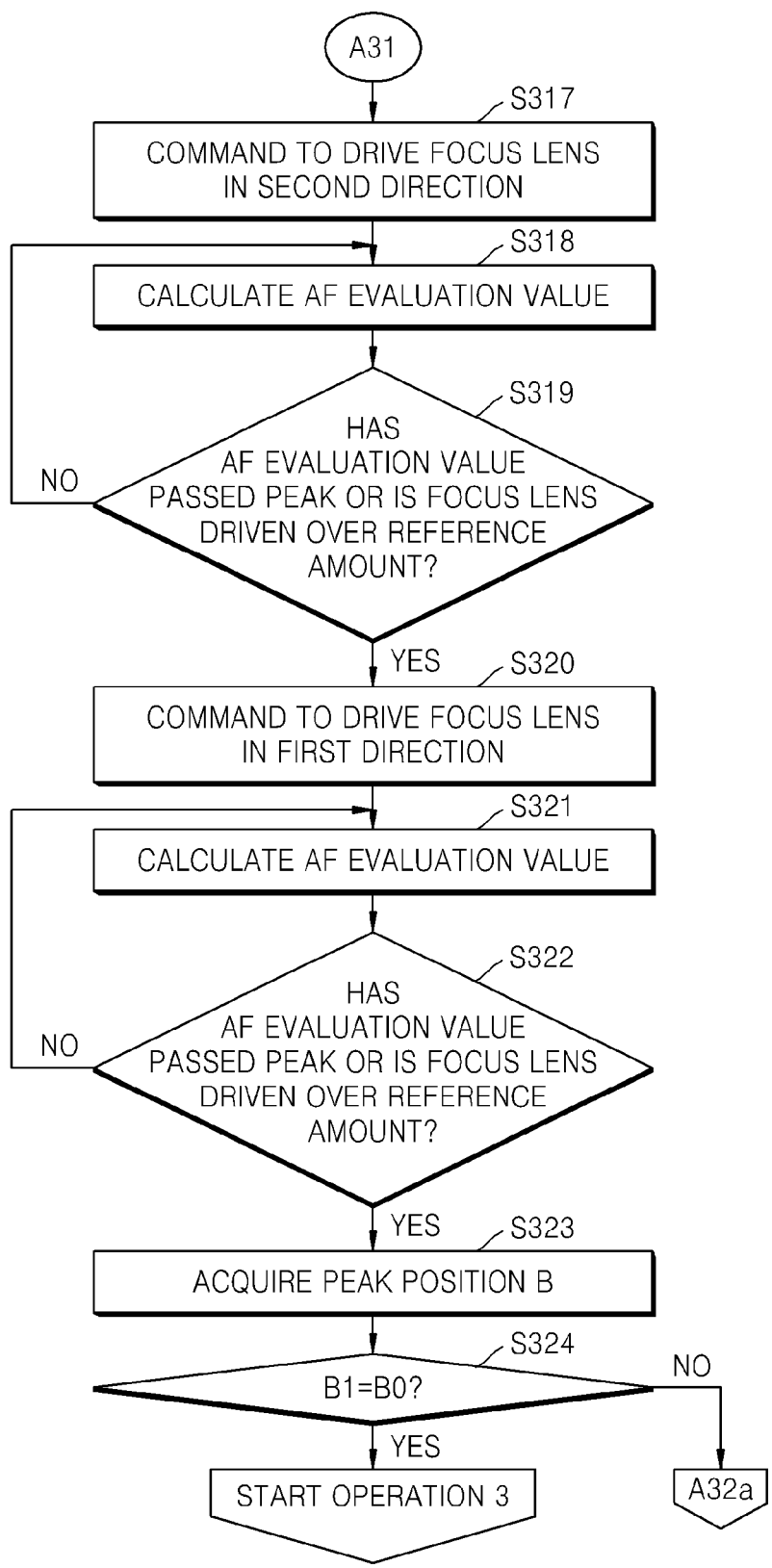
Figure 19B:
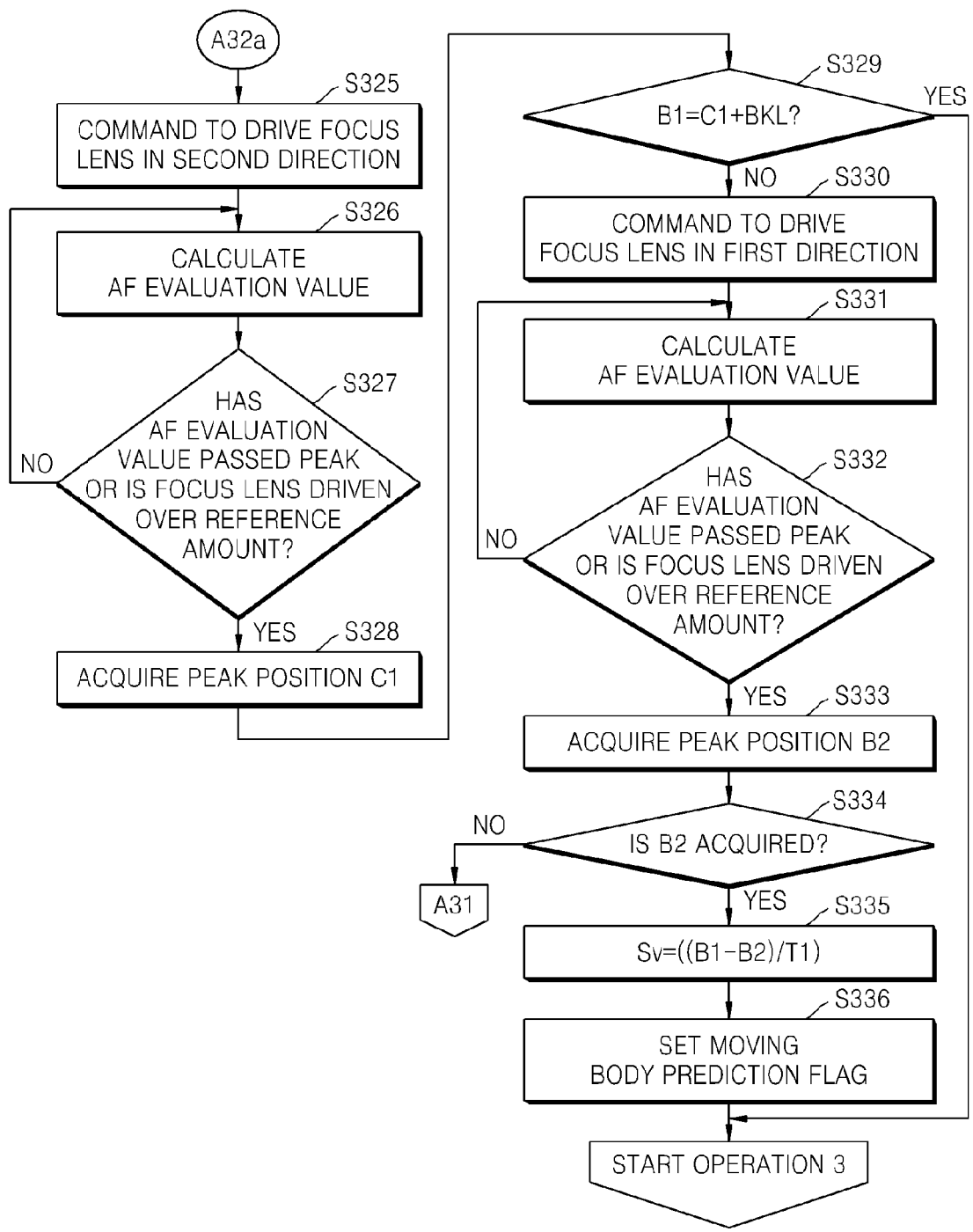

FIGS. 18, 19A, and 19B are flowcharts illustrating a method of controlling the digital photographing apparatus 1, according to another embodiment of the invention. FIGS. 18, 19A, and 19B illustrate an operation (operation 3) performed by applying the full-press signal S2 by a full press of the shutter release button while moving body tracking is being repeated. When the half-press signal S1 and the full-press signal S2 are turned on from the beginning, operation 3 starts after an initial in-focus is determined, i.e., after operations A and B of the AF operation end.

Referring to FIGS. 18, 19A, and 19B, in operation S301, the display unit 206 is turned off, the shutter 203 is in a closed state by driving the shutter 203 to block light incident on the image pickup device 204, and the iris 107 is driven to a proper iris value. In operation S302, it is determined whether the moving body prediction flag is set.

If the moving body prediction flag is not set, the digital photographing apparatus 1 proceeds to operation S305. Otherwise, if the moving body prediction flag is set, a compensation value AR is obtained by $\Delta R=Sv*T$ in operation S303, and a peak position is compensated for by $\Delta R$ in operation S304.

In operation S305, the focus lens 104 is driven in the second and first directions at a high speed to move to the peak position. In operation S306, it is determined whether driving the shutter 203 and the iris 107 is completed. In the current embodiment, although the operating time of operation S305 is designed to be shorter than the driving time of the shutter 203 and the iris 107, the invention is not limited thereto. For example, if the operating time of operation S305 is longer than the driving time of the shutter 203 and the iris 107, whether operation S305 has ended may be simultaneously determined when operation S306 is performed.

If it is determined in operation S306 that driving the shutter 203 and the iris 107 is not completed, the digital photographing apparatus 1 proceeds back to operation S305. Otherwise, if it is determined in operation S306 that driving the shutter 203 and the iris 107 is completed, light exposure starts in operation S307. When the light exposure ends, data is read in operation S308. The read data is applied to the camera controller 209, wherein the camera controller 209 performs signal processing on the read data and captures the read data as a still image.

If a subject is moving, in continuous photographing, a moving body compensation is performed for the next capturing after the current capturing. By doing this, the continuous photographing speed may increase. This process corresponds to operations S309 to S311.

In operation S309, it is determined whether the moving body prediction flag is set. If the moving body prediction flag is not set, the digital photographing apparatus 1 proceeds to operation S312. Otherwise, if the moving body prediction flag is set, a moving amount $\Delta R0$ of the subject is obtained by $\Delta R0=Sv*Tf$ in operation S310. The moving amount $\Delta R0$ corresponds to a moving body compensation driving amount immediately after light exposure, as shown in FIG. 10. In operation S311, the focus lens 104 is driven in the second and first directions at a high speed to meet a peak position compensated for by $\Delta R0$.

In operation S312, it is determined whether the data reading has ended. At this time, operation S312 may be simultaneously performed with determining whether the moving body compensation driving has ended. If the data reading has ended, driving for opening the shutter 203 and driving for returning the iris 107 to an open state are performed, and the display unit 206 is turned on in operation S313. In operation S314, the moving body prediction flag is reset. Although the moving body prediction flag is first reset under an assumption that the subject is not moving in the current embodiment, the invention is not limited thereto. For example, the moving body prediction flag may not be reset during continuous photographing, and this case is advantageous when a subject is moving at a high speed.

After the moving body prediction flag is reset, AF evaluation values are calculated again in operation S315. Then, it is determined in operation S316 whether a change in the AF evaluation values exists. Whether a change in the AF evaluation values exists may be determined from more than two AF evaluation values. However, the invention is not limited thereto. If a change in the AF evaluation values does not exist, it is determined that a peak position in next capturing is the same as a peak position in previous capturing, and the digital photographing apparatus 1 proceeds back to operation S301. Otherwise, if a change in the AF evaluation values exists, it is determined that the subject is moving or the digital photographing apparatus 1 is in the panning state, and the digital photographing apparatus 1 proceeds to an operation A31.

Otherwise, if it is determined in operation S316 that a change in the AF evaluation values exists, the same operations as operations S216 to S223 of FIG. 16 are performed. Thereafter, if it is determined in operation S324 that a previous peak position B0 is the same as a current peak position B1, the digital photographing apparatus 1 proceeds back to operation S301 to perform a capturing operation. Otherwise, if it is determined in operation S324 that the previous peak position B0 is different from the current peak position B1, a peak position C1 is acquired by performing operation C as in operations S231 to S240 of FIG. 17. However, if it is determined in operation S329 that B1 is the same as C1+BKL, the digital photographing apparatus 1 proceeds back to operation S301. Otherwise, if it is determined in operation S329 that B1 is different from C1+BKL, a peak position B2 is acquired by performing operation C in operations S330 to S333.

If it is determined in operation S334 that B2 is not acquired, it is determined that the possibility that the digital photographing apparatus 1 is in the panning state is high, and the digital photographing apparatus 1 proceeds back to operation S317 to detect a peak position again. Otherwise, if it is determined in operation S334 that B2 is acquired, a moving speed Sv of the subject is obtained by Sv=(B1−B2)/T1 in operation S335.

In the current embodiment, Sv is obtained by using B1 and B2 obtained in the same shutter open interval between successive capturing operations. However, as in the embodiments described with reference to FIGS. 12, 13, and 14, the moving speed Sv of a subject may be obtained from B1 obtained in previous capturing and B2 obtained before current capturing. In addition, when a subject is moving at a low speed, the moving speed of the subject may be obtained according to the flowcharts of FIGS. 19A and 19B, and when a subject is moving at a high speed, the moving speed of the subject may be obtained from B1 obtained in previous capturing and B2 obtained before current capturing. As described above, a method of obtaining the moving speed of a subject may vary according to the moving speed of the subject. In addition, the moving speed of a subject may be calculated by using a second or higher order equation.

When the calculation of the moving speed of the subject is completed, the moving body prediction flag is set in operation S336, and the digital photographing apparatus 1 proceeds back to operation S301.

Figure 20A:
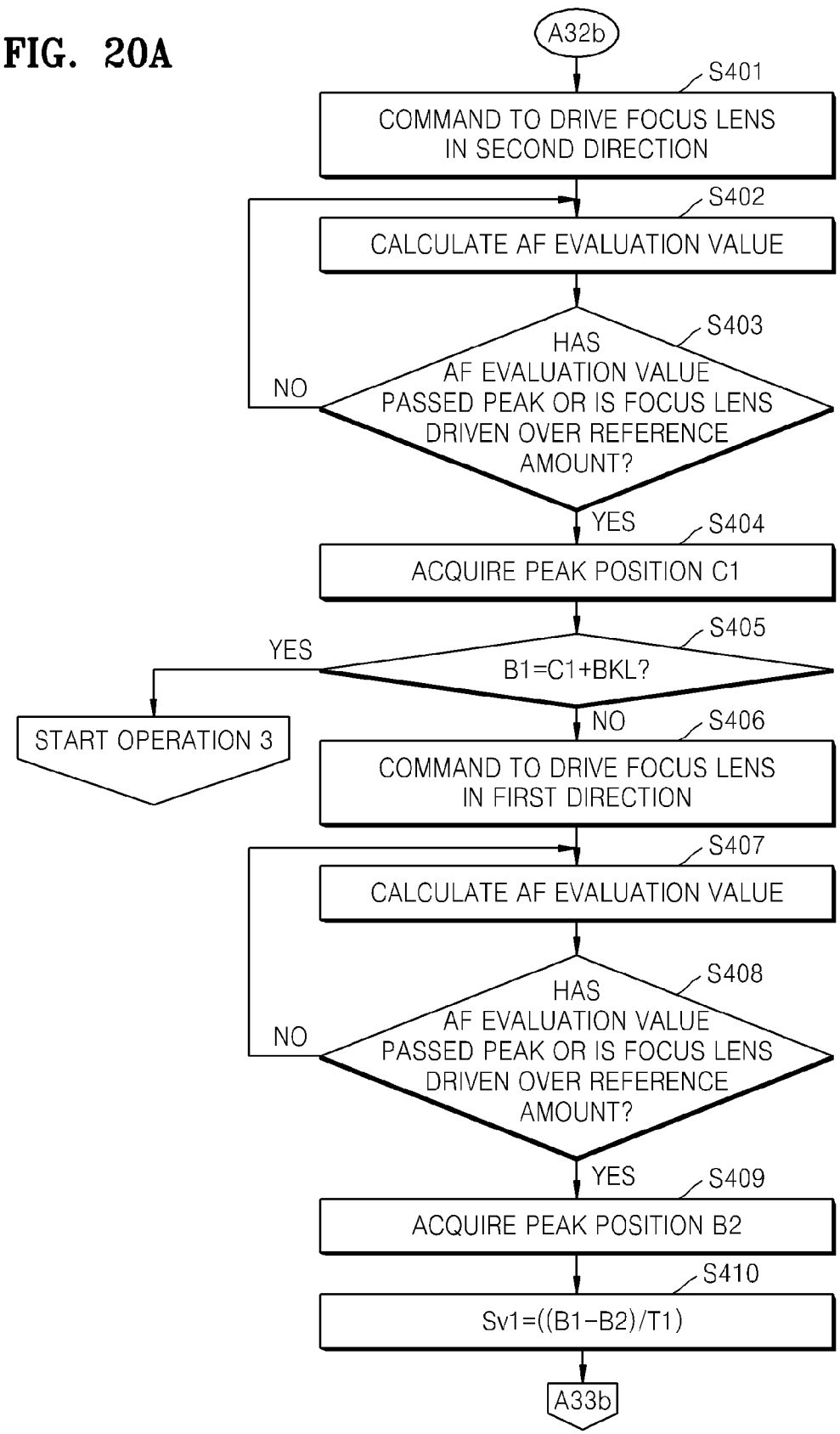
FIGS. 20A and 20B are flowcharts illustrating another embodiment of FIG. 19B.
Figure 20B:
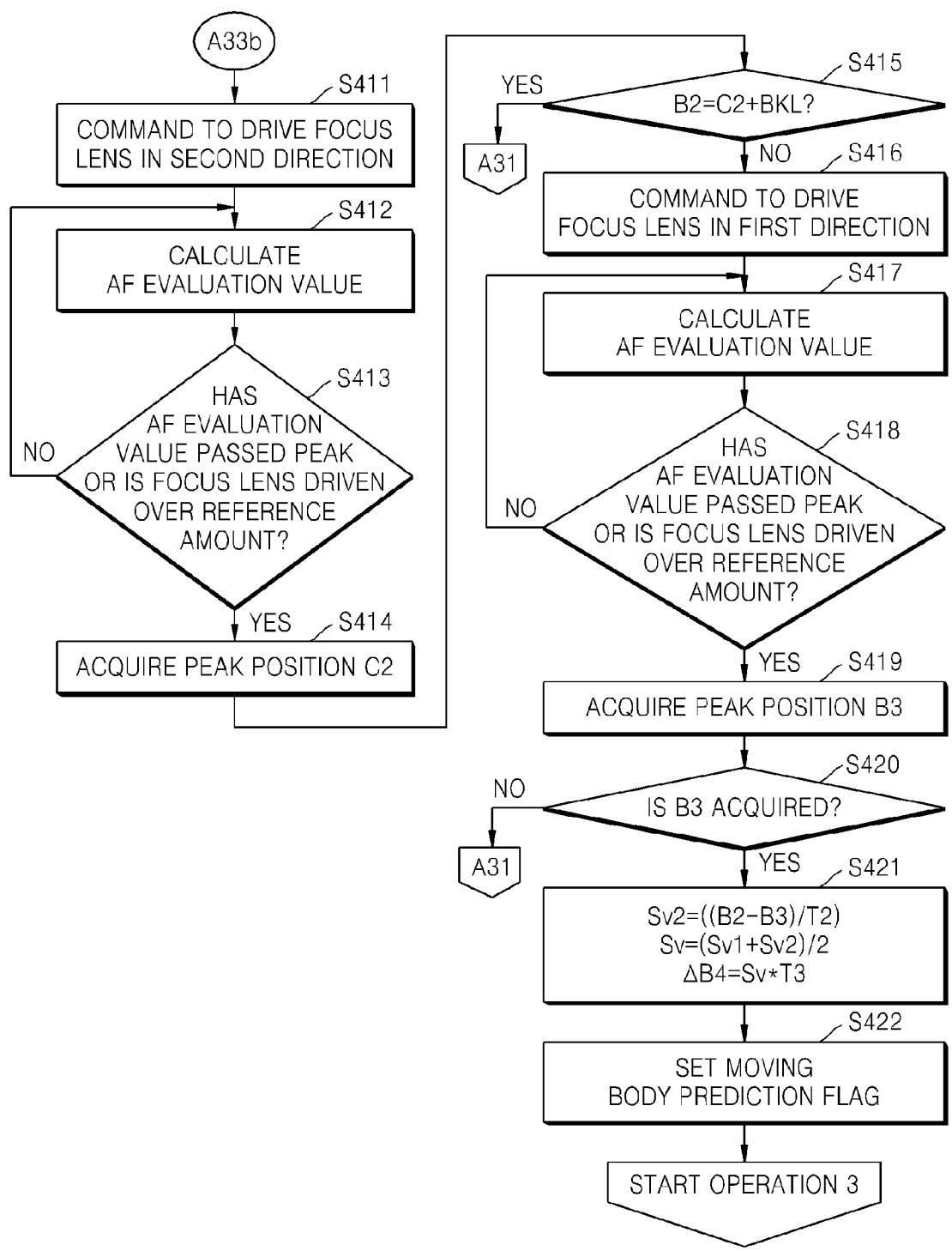

FIGS. 20A and 20B are flowcharts illustrating another embodiment of an operation A32a of FIG. 19B. In the current embodiment, the moving speed of a subject is obtained by using three pieces of information B1, B2, and B3 as described with reference to FIG. 9. The current embodiment will be described with respect to how it differs from operation A32a of FIG. 19B.

Referring to FIGS. 20A and 20B, operations S401 to S409 are the same as operations S325 to S333 of FIG. 19B. In operation S410, the moving speed Sv1 of a subject is obtained from B1 and B2. Sv1 may be obtained by (B1−B2)/T1. As described above, in operations S411 to S419, a peak position B3 is obtained by performing a scanning operation from B2 to B3.

If it is determined in operation S420 that B3 is not acquired, it is determined that the digital photographing apparatus 1 is in the panning state, and the digital photographing apparatus 1 proceeds back to operation S317 to perform an AF scanning operation again. Otherwise, if it is determined in operation S420 that B3 is acquired, the moving speed Sv2 of the subject is obtained from B2 and B3 in operation S421. This is the moving speed of the subject from B2 to B3 of FIG. 6. Sv2 is obtained by (B2−B3)/T2. Thereafter, the average value Sv of the moving speeds is obtained by (Sv1+Sv2)/2. After the average moving speed of the subject is obtained, a compensation amount ΔB4 for the moving body compensation driving is obtained by Sv*T3 in operation S421.

In operation S422, the moving body prediction flag is set, and the digital photographing apparatus 1 proceeds back to operation S301 to perform capturing through the moving body compensation driving.

Figure 21:
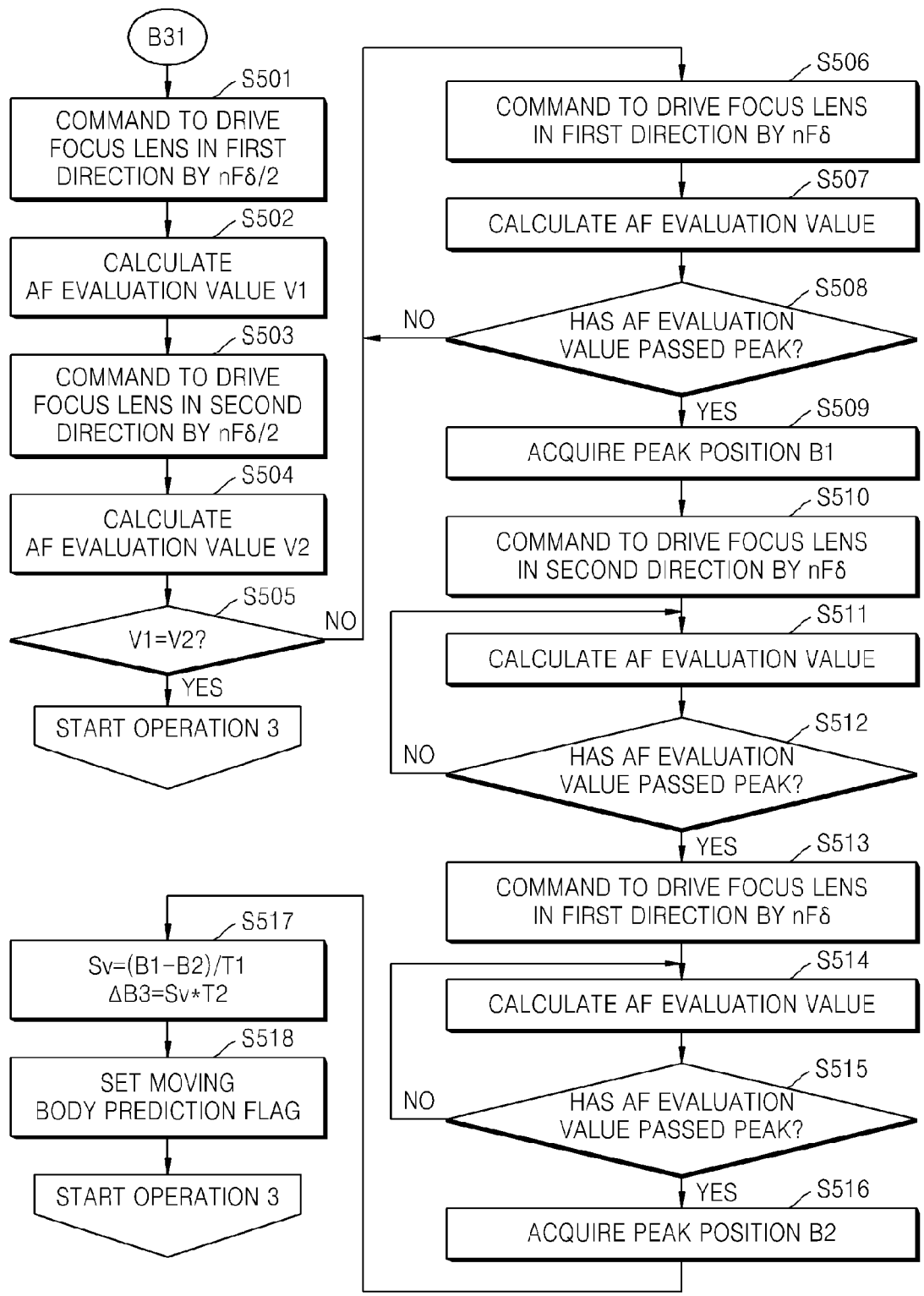
FIG. 21 is a flowchart illustrating another embodiment of FIGS. 19A and 19B.

FIG. 21 is a flowchart illustrating another embodiment of operation A31 of FIGS. 19A and 19B. The current embodiment illustrates a method of performing moving body prediction AF by using the wobbling operation.

Referring to FIG. 21, in operation S501, the focus lens 104 is driven in the first direction by a very small amount of nFδ/2. Here, n may be a number of about 1 to 3, F denotes an iris value, δ denotes an allowable circle of confusion of the digital photographing apparatus 1, and Fδ denotes a DOF. In operation S502, an AF evaluation value V1 is acquired.

In operation S503, the focus lens 104 is driven in the second direction by a very small amount of nFδ. In operation S504, an AF evaluation value V2 is acquired.

In operation 505, it is determined whether V1 is the same as V2. If V1 is the same as V2, it is determined that the subject is not moving, and the digital photographing apparatus 1 proceeds back to operation S301 to perform a capturing operation. Otherwise, if V1 is different from V2, the focus lens 104 is driven in the first direction by a very small amount of nFδ in operation S506, and an AF evaluation value is calculated in operation S507.

In operation S508 it is determined whether the calculated AF evaluation value has passed a peak position. If it is determined that the calculated AF evaluation value has not passed a peak position, the digital photographing apparatus 1 proceeds back to operation S506. If the subject is not moving, the calculated AF evaluation value has generally passed a peak position, and if the calculated AF evaluation value has not passed a peak position, it is obvious that the subject is moving. Thus, if it is determined that the calculated AF evaluation value has passed a peak position, the peak position B1 is acquired in operation S509.

In operations S510 to S512, it is determined whether an AF evaluation value has passed a peak position, by driving the focus lens 10 in the second direction. In operations S513 to S515, it is determined whether an AF evaluation value has passed a peak position, by driving the focus lens 10 in the first direction.

In operation S516, a peak position B2 is acquired, and in operation S517, a moving speed Sv (=(B1−B2)/T1) of the subject and a driving amount ΔB3(=Sv*T2) for moving body compensation are obtained. In operation S518, the moving body prediction flag is set, and the digital photographing apparatus 1 proceeds back to operation S301.

As described above, the digital photographing apparatus 1 according to the embodiments of the invention may capture images by correctly and quickly focusing a subject by performing moving body prediction AF and moving body compensation driving when the subject is moving.

A program for executing a driving method according to the above-described embodiments and their modifications in the digital photographing apparatus 1 may be stored in a computer-readable recording medium (not shown).

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A photographing apparatus comprising:
a focus lens;
a focus lens driver for driving the focus lens;
an image pickup device for generating an image signal by picking up light which has passed through the focus lens;
a processor for determining a focal position of the focus detection;
a shutter for controlling light exposure of the image pickup device;
an iris; and
an iris driving actuator for driving the iris,
wherein the processor determines a driving direction of the focus lens based on at least two image frames which are obtained on different focal positions from each other before capturing of a still image to be stored in a memory card, the at least two image frames are obtained while displaying a live-view image, and the iris driving actuator opens the iris while obtaining the at least two image frames, and adjusts the iris to a calculated iris value before the still image to be stored in the memory card is captured.

2. The photographing apparatus of claim 1, wherein when it is determined that a movement of the object exists, the at least two image frames are obtained.

3. The photographing apparatus of claim 1, wherein the movement of the subject includes a movement in an optical axis direction.

4. The photographing apparatus of claim 1, when a continuous photographing for continuously capturing still images is performed: after a previous still image capturing and before a light exposure preparation interval for a subsequent still image capturing, the processor determines the driving direction; and the focus lens driver moves the focus lens by the determined driving direction before the subsequent still image capturing starts.

5. The photographing apparatus of claim 1, wherein the processor calculates a moving speed of a subject based on the at least two image frames, and the focus lens driver moves the focus lens in order to obtain the at least two image frames based on the calculated moving speed.

6. The photographing apparatus of claim 1, wherein the processor determines the driving direction based on a pre-stored information related to focusing.

7. The photographing apparatus of claim 1, wherein the shutter is a mechanical shutter including a front curtain and a rear curtain.

8. The photographing apparatus of claim 1, wherein the shutter is an electronic front curtain shutter including an electronic front curtain for beginning light exposure by resetting electric charges and a mechanical rear curtain for ending the light exposure.

9. The photographing apparatus of claim 1, wherein the moving of the focus lens in the determined driving direction is performed in an interval before beginning to drive an electronic front curtain for the subsequent image capturing after stopping driving for selectively reading electric charges from the image pickup device.

10. The photographing apparatus of claim 1, wherein the shutter is a global shutter including an electronic front curtain for beginning light exposure by resetting electric charges and an electronic rear curtain for ending the light exposure.

11. The photographing apparatus of claim 1, wherein the moving the focus lens in the determined driving direction is performed in an interval before beginning to drive an electronic front curtain for image capturing after stopping driving for selectively reading electric charges from the image pickup device.

12. The photographing apparatus of claim 1, wherein the at least two image frames are obtained while displaying a live-view image, the photographing apparatus ends the displaying of the live-view image before a subsequent still image capturing, and the moving the focus lens in the determined driving direction is performed in an interval before beginning the image capturing after ending the displaying of the live-view image.

13. The photographing apparatus of claim 1, wherein the detection of the focal position is performed by driving the focus lens back and forth.

14. The photographing apparatus of claim 1, wherein, during a continuous photographing, detecting the focal position multiple times is performed in an image pickup interval before a light exposure preparation interval, and a moving speed of the subject is calculated from a result of the detecting of the focal position multiple times.

15. The photographing apparatus of claim 1, wherein, during a continuous photographing, the focal position detection is performed at least once in a image pickup interval before a light exposure preparation interval for every still image capturing, and a moving speed of the subject is calculated by using a focal position result detected in the image pickup interval for current still image capturing and a focal position result detected in the image pickup interval for the previous still image capturing.

16. The photographing apparatus of claim 1, wherein during a continuous photographing, a moving speed of the subject is determined by using the moving speed of the subject acquired before the continuous photographing starts or a moving speed of the subject obtained in the previous still image capturing during the continuous photographing.

17. The photographing apparatus of claim 1, wherein, when a moving speed of the subject before a continuous photographing starts is acquired, the acquired moving speed and the moving speed of the subject acquired during the continuous photographing are used to predict a focal position in the subsequent still image capturing, and when the moving speed of the subject before the continuous photographing starts is not acquired, the moving speed of the subject acquired during the continuous photographing is used to predict a focal position in the subsequent image capturing.

18. The AF adjusting apparatus of claim 1, wherein, when a moving speed of the subject is acquired, the moving the focus lens in the determined driving direction is performed by predicting the focal position according to movement of the subject in an interval from a light exposure end time to an image pickup start time before the light exposure preparation interval for the subsequent still image capturing by using the acquired moving speed.

19. A method for controlling a photographing apparatus comprising:

obtaining at least two image frames on different focal positions from each other before capturing of a still image to be stored in a memory card;

determining a driving direction of a focus lens based on the obtained at least two image frames;

capturing a still image to be stored in a memory card, wherein the at least two image frames are obtained while displaying a live-view image, and an iris is open while the at least two image frames are obtained, and is adjusted to a calculated iris value before the still image to be stored in the memory card is captured.

* * * * *